(12) United States Patent
Schumacher et al.

(10) Patent No.: US 11,260,723 B2
(45) Date of Patent: Mar. 1, 2022

(54) METHODS AND SYSTEMS FOR POWER AND LOAD MANAGEMENT OF A TRANSPORT CLIMATE CONTROL SYSTEM

(71) Applicant: THERMO KING CORPORATION, Minneapolis, MN (US)

(72) Inventors: Ryan Wayne Schumacher, Bloomington, MN (US); Frantisek Zebra, Necin (CZ); Joan Vila Soler, Minneapolis, MN (US); Jordi Garcia Farran, Minneapolis, MN (US); Vikram Madineni, Dusseldorf (DE)

(73) Assignee: Thermo King Corporation, Minneapolis, MN (US)

( * ) Notice: Subject to any disclaimer, the term of this patent is extended or adjusted under 35 U.S.C. 154(b) by 195 days.

(21) Appl. No.: 16/574,775

(22) Filed: Sep. 18, 2019

(65) Prior Publication Data

US 2020/0086712 A1 Mar. 19, 2020

(30) Foreign Application Priority Data

Sep. 19, 2018 (EP) ................................. EP18382673

(51) Int. Cl.
*B60H 1/00* (2006.01)
*B60P 3/20* (2006.01)
(Continued)

(52) U.S. Cl.
CPC ............ *B60H 1/00885* (2013.01); *B60P 3/20* (2013.01); *B60R 16/033* (2013.01); *B60H 1/3232* (2013.01)

(58) Field of Classification Search
CPC ............ B60H 1/00885; B60H 1/00428; B60H 1/00735; B60H 1/3232; B60P 3/20; F24F 11/00
See application file for complete search history.

(56) References Cited

U.S. PATENT DOCUMENTS

| 3,875,483 A | 4/1975 | Farr |
| 5,104,037 A | 4/1992 | Karg et al. |

(Continued)

FOREIGN PATENT DOCUMENTS

| CN | 2456117 | 10/2001 |
| CN | 1885660 | 12/2006 |

(Continued)

OTHER PUBLICATIONS

European Search Report, cited in the European Patent Application No. 18382673.4, dated Apr. 11, 2019, 12 pages.

(Continued)

*Primary Examiner* — Elizabeth J Martin
(74) *Attorney, Agent, or Firm* — Hamre, Schumann, Mueller & Larson, P.C.

(57) ABSTRACT

A method for power and load management of a transport climate control system using a vehicle electrical system is provided. The method includes a controller determining a power draw of the transport climate control load network, determining an amount of power available from the vehicle electrical system, and determining whether the power draw of the transport climate control load network exceeds the amount of power available from the vehicle electrical system. Also, the method includes shedding one or more loads of the transport climate control load network to reduce the power draw of the transport climate control load network until the power draw of the transport climate control load network matches the power available from the vehicle electrical system. Further, the method includes supplying power from the vehicle electrical system to the transport climate control load network.

20 Claims, 13 Drawing Sheets

(51) Int. Cl.
  *B60R 16/033*  (2006.01)
  *B60H 1/32*  (2006.01)

(56)  References Cited

U.S. PATENT DOCUMENTS

| | | | |
|---|---|---|---|
| 5,231,849 A | 8/1993 | Rosenblatt | |
| 6,034,445 A | 3/2000 | Hewitt | |
| 6,280,320 B1 | 8/2001 | Paschke et al. | |
| 6,487,869 B1* | 12/2002 | Sulc | B60H 1/3205 |
| | | | 62/228.4 |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,652,330 B1 | 11/2003 | Wasilewski | |
| 6,688,125 B2 | 2/2004 | Okamoto et al. | |
| 6,700,214 B2 | 3/2004 | Ulinski et al. | |
| 6,753,692 B2 | 6/2004 | Toyomura et al. | |
| 6,925,826 B2 | 8/2005 | Hille et al. | |
| 7,011,902 B2 | 3/2006 | Pearson | |
| 7,120,539 B2 | 10/2006 | Krull et al. | |
| 7,122,923 B2 | 10/2006 | Lafontaine et al. | |
| 7,151,326 B2 | 12/2006 | Jordan | |
| 7,176,658 B2 | 2/2007 | Quazi et al. | |
| 7,206,692 B2 | 4/2007 | Beesley et al. | |
| 7,327,123 B2 | 2/2008 | Faberman et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,745,953 B2 | 6/2010 | Puccetti et al. | |
| 7,806,796 B2 | 10/2010 | Zhu | |
| 7,830,117 B2 | 11/2010 | Ambrosio et al. | |
| 7,898,111 B1 | 3/2011 | Pistel | |
| 7,900,462 B2 | 3/2011 | Hegar et al. | |
| 8,020,651 B2 | 9/2011 | Zillmer et al. | |
| 8,030,880 B2 | 10/2011 | Alston et al. | |
| 8,134,339 B2 | 3/2012 | Burlak et al. | |
| 8,170,886 B2 | 5/2012 | Luff | |
| 8,214,141 B2 | 7/2012 | Froeberg | |
| 8,295,950 B1 | 10/2012 | Wordsworth et al. | |
| 8,381,540 B2 | 2/2013 | Alston | |
| 8,441,228 B2 | 5/2013 | Brabec | |
| 8,476,872 B2 | 7/2013 | Truckenbrod et al. | |
| 8,487,458 B2 | 7/2013 | Steele et al. | |
| 8,541,905 B2 | 9/2013 | Brabec | |
| 8,602,141 B2 | 12/2013 | Yee et al. | |
| 8,626,367 B2 | 1/2014 | Krueger et al. | |
| 8,626,419 B2 | 1/2014 | Mitchell et al. | |
| 8,643,216 B2 | 2/2014 | Lattin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,742,620 B1 | 6/2014 | Brennan et al. | |
| 8,760,115 B2 | 6/2014 | Kinser et al. | |
| 8,764,469 B2 | 7/2014 | Lamb | |
| 8,767,379 B2 | 7/2014 | Whitaker | |
| 8,818,588 B2 | 8/2014 | Ambrosio et al. | |
| 8,862,356 B2 | 10/2014 | Miller | |
| 8,912,683 B2 | 12/2014 | Dames et al. | |
| 8,924,057 B2 | 12/2014 | Kinser et al. | |
| 8,978,798 B2 | 5/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabec | |
| 9,147,335 B2 | 9/2015 | Raghunathan et al. | |
| 9,199,543 B2 | 12/2015 | Brabec | |
| 9,313,616 B2 | 4/2016 | Mitchell et al. | |
| 9,436,853 B1 | 9/2016 | Meyers | |
| 9,440,507 B2 | 9/2016 | Giovanardi et al. | |
| 9,463,681 B2 | 10/2016 | Olaleye et al. | |
| 9,464,839 B2 | 10/2016 | Rusignuolo et al. | |
| 9,557,100 B2 | 1/2017 | Chopko et al. | |
| 9,562,715 B2* | 2/2017 | Kandasamy | B60H 1/00428 |
| 9,694,697 B2 | 7/2017 | Brabec | |
| 9,738,160 B2 | 8/2017 | Bae et al. | |
| 9,758,013 B2 | 9/2017 | Steele | |
| 9,783,024 B2 | 10/2017 | Connell et al. | |
| 9,784,780 B2 | 10/2017 | Loftus et al. | |
| 9,802,482 B2 | 10/2017 | Schumacher et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,975,403 B2 | 5/2018 | Rusignuolo et al. | |
| 9,975,446 B2 | 5/2018 | Weber et al. | |
| 9,987,906 B2 | 6/2018 | Kennedy | |
| 10,000,122 B2 | 6/2018 | Wu et al. | |
| 10,148,212 B2 | 12/2018 | Schumacher et al. | |
| 10,230,236 B2 | 3/2019 | Schumacher et al. | |
| 10,240,847 B1 | 3/2019 | Thomas, Jr. | |
| 1,042,753 A1 | 10/2019 | Symanow et al. | |
| 10,875,497 B2 | 12/2020 | Smec | |
| 10,995,760 B1 | 5/2021 | Stubbs | |
| 11,034,213 B2 | 6/2021 | Wenger et al. | |
| 2001/0025349 A1 | 9/2001 | Sharood et al. | |
| 2002/0113576 A1 | 8/2002 | Oomura et al. | |
| 2003/0043607 A1 | 3/2003 | Vinciarelli et al. | |
| 2003/0106332 A1 | 6/2003 | Okamoto et al. | |
| 2003/0200017 A1 | 10/2003 | Capps et al. | |
| 2003/0201097 A1 | 10/2003 | Zeigler et al. | |
| 2004/0168455 A1 | 9/2004 | Nakamura | |
| 2005/0057210 A1 | 3/2005 | Ueda et al. | |
| 2005/0065684 A1 | 3/2005 | Larson et al. | |
| 2005/0285445 A1 | 12/2005 | Wruck et al. | |
| 2006/0284601 A1 | 12/2006 | Salasoo et al. | |
| 2007/0052241 A1 | 3/2007 | Pacy | |
| 2007/0192116 A1 | 8/2007 | Levitt | |
| 2008/0147270 A1 | 6/2008 | Sakane et al. | |
| 2008/0177678 A1 | 7/2008 | Di Martini et al. | |
| 2008/0281473 A1 | 11/2008 | Pitt | |
| 2009/0121798 A1 | 5/2009 | Levinson | |
| 2009/0122901 A1 | 5/2009 | Choi et al. | |
| 2009/0126901 A1 | 5/2009 | Hegar et al. | |
| 2009/0178424 A1 | 7/2009 | Hwang et al. | |
| 2009/0195349 A1 | 8/2009 | Frader-Thompson et al. | |
| 2009/0228155 A1 | 9/2009 | Slifkin et al. | |
| 2009/0229288 A1 | 9/2009 | Alston et al. | |
| 2009/0314019 A1 | 12/2009 | Fujimoto et al. | |
| 2009/0320515 A1 | 12/2009 | Bischofberger et al. | |
| 2010/0045105 A1 | 2/2010 | Bovio et al. | |
| 2010/0089669 A1 | 4/2010 | Taguch | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0118916 A1 | 5/2011 | Gullichsen | |
| 2011/0162395 A1 | 7/2011 | Chakiachvili et al. | |
| 2011/0208378 A1 | 8/2011 | Krueger et al. | |
| 2011/0224841 A1 | 9/2011 | Profitt-Brown et al. | |
| 2011/0241420 A1 | 10/2011 | Hering et al. | |
| 2011/0265506 A1 | 11/2011 | Alston | |
| 2011/0290893 A1 | 12/2011 | Steinberg | |
| 2012/0000212 A1 | 1/2012 | Sanders et al. | |
| 2012/0116931 A1 | 5/2012 | Meyers | |
| 2012/0153722 A1 | 6/2012 | Nazarian | |
| 2012/0198866 A1 | 8/2012 | Zeidner | |
| 2012/0245772 A1 | 9/2012 | King | |
| 2012/0310376 A1 | 12/2012 | Krumm et al. | |
| 2012/0310416 A1 | 12/2012 | Tepper et al. | |
| 2013/0000342 A1 | 1/2013 | Blasko et al. | |
| 2013/0073094 A1 | 3/2013 | Knapton et al. | |
| 2013/0088900 A1 | 4/2013 | Park | |
| 2013/0158828 A1 | 6/2013 | McAlister | |
| 2013/0175975 A1 | 7/2013 | Shinozaki | |
| 2013/0197730 A1 | 8/2013 | Huntzicker | |
| 2013/0197748 A1 | 8/2013 | Whitaker | |
| 2013/0231808 A1 | 9/2013 | Flath et al. | |
| 2014/0018969 A1 | 1/2014 | Forbes, Jr. | |
| 2014/0020414 A1 | 1/2014 | Rusignuolo et al. | |
| 2014/0026599 A1 | 1/2014 | Rusignuolo et al. | |

(56) References Cited

U.S. PATENT DOCUMENTS

| | | |
|---|---|---|
| 2014/0060097 A1 | 3/2014 | Perreault |
| 2014/0137590 A1 | 5/2014 | Chopko et al. |
| 2014/0203760 A1 | 7/2014 | Lammers |
| 2014/0230470 A1 | 8/2014 | Cook |
| 2014/0265560 A1 | 9/2014 | Leehey et al. |
| 2014/0283533 A1 | 9/2014 | Kurtzman et al. |
| 2014/0335711 A1 | 11/2014 | Lamb |
| 2014/0343741 A1 | 11/2014 | Clarke |
| 2015/0019132 A1 | 1/2015 | Gusikhin et al. |
| 2015/0081212 A1 | 3/2015 | Mitchell et al. |
| 2015/0121923 A1 | 5/2015 | Rusignuolo et al. |
| 2015/0168032 A1 | 6/2015 | Steele |
| 2015/0188360 A1 | 7/2015 | Doane et al. |
| 2015/0246593 A1 | 9/2015 | Larson et al. |
| 2015/0306937 A1 | 10/2015 | Kitamura et al. |
| 2015/0316301 A1 | 11/2015 | Kolda et al. |
| 2015/0344044 A1 | 12/2015 | Yuasa |
| 2015/0345958 A1 | 12/2015 | Graham |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0144764 A1 | 5/2016 | Dutta et al. |
| 2016/0156258 A1 | 6/2016 | Yokoyama |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0107910 A1 | 4/2017 | Huang |
| 2017/0190263 A1 | 7/2017 | Enzinger et al. |
| 2017/0210194 A1 | 7/2017 | Ling |
| 2017/0217280 A1 | 8/2017 | Larson et al. |
| 2017/0219374 A1 | 8/2017 | Sitarski et al. |
| 2017/0237355 A1 | 8/2017 | Stieneker et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1* | 2/2018 | Zaeri ................. B60H 1/3232 |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0170349 A1 | 6/2018 | Jobson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0238698 A1 | 8/2018 | Pedersen |
| 2018/0306533 A1 | 10/2018 | Alahyari et al. |
| 2018/0326813 A1 | 11/2018 | Ganiere |
| 2018/0334012 A1 | 11/2018 | Geller et al. |
| 2018/0342876 A1 | 11/2018 | Agnew et al. |
| 2018/0342877 A1 | 11/2018 | Too et al. |
| 2018/0356870 A1 | 12/2018 | Rusignuolo et al. |
| 2019/0047496 A1 | 2/2019 | Sufrin-Disler et al. |
| 2019/0081489 A1 | 3/2019 | Gerber et al. |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0277561 A1 | 9/2019 | Spath |
| 2019/0277647 A1 | 9/2019 | Adetola et al. |
| 2019/0283536 A1 | 9/2019 | Suzuki et al. |
| 2019/0283541 A1 | 9/2019 | Adetola et al. |
| 2019/0308487 A1 | 10/2019 | Badger, II et al. |
| 2020/0050753 A1 | 2/2020 | Davis et al. |
| 2020/0076029 A1 | 3/2020 | Litz |
| 2020/0086744 A1 | 3/2020 | Schumacher et al. |
| 2020/0101820 A1 | 4/2020 | Wenger et al. |
| 2020/0106271 A1 | 4/2020 | Rydkin et al. |
| 2020/0130471 A1 | 4/2020 | Leasure |
| 2020/0130473 A1 | 4/2020 | Schumacher et al. |
| 2020/0130645 A1 | 4/2020 | Smec |
| 2020/0136504 A1 | 4/2020 | Schumacher et al. |
| 2020/0189361 A1 | 6/2020 | Radcliff |
| 2020/0207184 A1 | 7/2020 | Schumacher et al. |
| 2020/0231041 A1 | 7/2020 | Lavrich et al. |
| 2021/0061156 A1 | 3/2021 | Swab |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| DE | 102014208015 | 10/2015 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 2768693 | 5/2019 |
| EP | 536552 | 9/2019 |
| EP | 3540340 | 9/2019 |
| EP | 3536552 | 11/2019 |
| GB | 2551999 | 1/2018 |
| JP | 2000158930 | 6/2000 |
| JP | 2007320352 | 12/2007 |
| JP | 2009243780 | 10/2009 |
| JP | 5772439 | 9/2015 |
| JP | 2018-136090 | 8/2018 |
| JP | 2019145521 | 8/2019 |
| KR | 10-2012-0092834 | 8/2012 |
| SE | 541327 | 7/2019 |
| WO | 03038988 | 5/2003 |
| WO | 2008153518 | 12/2008 |
| WO | 2009155941 | 12/2009 |
| WO | 2010065476 | 6/2010 |
| WO | 2011066468 | 6/2011 |
| WO | 2011094099 | 8/2011 |
| WO | 2012138497 | 10/2012 |
| WO | 2012138500 | 10/2012 |
| WO | 2013075623 | 5/2013 |
| WO | 2013096084 | 6/2013 |
| WO | 2014002244 | 1/2014 |
| WO | 2014/058610 | 4/2014 |
| WO | 2014085672 | 6/2014 |
| WO | 2014106060 | 7/2014 |
| WO | 2014106068 | 7/2014 |
| WO | 2016038838 | 3/2016 |
| WO | 2016145107 | 9/2016 |
| WO | 2017058660 | 4/2017 |
| WO | 2017/083336 | 5/2017 |
| WO | 2017083333 | 5/2017 |
| WO | 2017151698 | 9/2017 |
| WO | 2017/172855 | 10/2017 |
| WO | 2017172484 | 10/2017 |
| WO | 2017176682 | 10/2017 |
| WO | 2017176725 | 10/2017 |
| WO | 2017176729 | 10/2017 |

(56) References Cited

FOREIGN PATENT DOCUMENTS

| WO | 2017189485 | 11/2017 |
|---|---|---|
| WO | 2017218909 | 12/2017 |
| WO | 2017218910 | 12/2017 |
| WO | 2017218912 | 12/2017 |
| WO | 2018/009798 | 1/2018 |
| WO | 2018/017450 | 1/2018 |
| WO | 2018005957 | 1/2018 |
| WO | 2018009646 | 1/2018 |
| WO | 2018017818 | 1/2018 |
| WO | 2018029502 | 2/2018 |
| WO | 2018/204591 | 11/2018 |
| WO | 2018204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

"Lamberet Smart Reefer on Solutrans", ZOEKEN, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System", filed Sep. 9, 2019, 59 pages.

U.S. Appl. No. 16/730,126, titled "Transport Climate Control System Power Architecture", filed Dec. 30, 2019, 27 pages.

U.S. Appl. No. 16/574,754, titled "Methods and Systems for Energy Management of a Transport Climate Control System", filed Sep. 18, 2019, 50 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/176,720, titled "Methods and Systems for Augmenting a Vehicle Powered Transport Climate Control System", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/235,865, titled "Methods and Systems for Preserving Autonomous Operation of a Transport Climate Control System", filed Dec. 28, 2018, 41 pages.

U.S. Appl. No. 17/420,022, titled "Methods and Systems for Providing Predictive Energy Consumption Feedback for Powering a Transport Climate Control System", filed Jun. 30, 2021, 34 pages.

U.S. Appl. No. 17/420,032, titled "Methods and Systems for Notifying and Mitigating a Suboptimal Event Occurring in a Transport Climate Control System", filed Jun. 30, 2021, 44 pages.

U.S. Appl. No. 17/420,037, titled "Methods and Systems for Providing Feedback for a Transport Climate Control System", filed Jun. 30, 2021, 37 pages.

U.S. Appl. No. 17/420,043, titled "Methods and Systems for Providing Predictive Energy Consumption Feedback for Powering a Transport Climate Control System Using External Data", filed Jun. 30, 2021, 39 pages.

U.S. Appl. No. 16/911,692, titled "Climate Controlled Vehicle, Transport Climate Control Equipment, Method of Retrofitting a Vehicle and Method of Operation", filed Jun. 25, 2020, 39 pages.

U.S. Appl. No. 16/565,110, titled "Transport Climate Control System With a Self-Configuring Matrix Power Converter", filed Sep. 9, 2019, 52 pages.

U.S. Appl. No. 16/565,146, titled "Optimized Power Management for a Transport Climate Control Energy Source", filed Sep. 9, 2019, 53 pages.

U.S. Appl. No. 62/897,833, titled "Optimized Power Distribution To Transport Climate Control Systems Amongst One or More Electric Supply Equipment Stations", filed Sep. 9, 2019, 41 pages.

European Patent Application No. 19382776.3, titled "MPrioritized Power Delivery for Facilitating Transport Climate Control", filed Sep. 9, 2019, 41 pages.

U.S. Appl. No. 16/565,282, titled "Optimized Power Cord for Transferring Power To a Transport Climate Control System", filed Sep. 9, 2019, 43 pages.

U.S. Appl. No. 16/565,235, titled "Interface System for Connecting a Vehicle and a Transport Climate Control System", filed Sep. 9, 2019, 64 pages.

U.S. Appl. No. 16/565,205, titled "Transport Climate Control System With an Accessory Power Distribution Unit for Managing Transport Climate Control Loads", filed Sep. 9, 2019, 57 pages.

U.S. Appl. No. 17/015,190, titled "Optimized Power Distribution To Transport Climate Control Systems Amongst One or More Electric Supply Equipment Stations", filed Sep. 9, 2020, 43 pages.

U.S. Appl. No. 16/147,708, titled "Methods and Systems for Autonomous Climate Control Optimization of a Transport Vehicle", filed Sep. 29, 2018, 41 pages.

U.S. Appl. No. 16/176,667, titled "Drive Off Protection System and Method for Preventing Drive Off", filed Oct. 31, 2018, 41 pages.

U.S. Appl. No. 16/565,252, titled "Demand-Side Power Distribution Management For a Plurality of Transport Climate Control Systems", filed Sep. 9, 2019, 44 pages.

U.S. Appl. No. 17/015,194, titled "Prioritized Power Delivery for Facilitating Transport Climate Control", filed Sep. 9, 2020, 41 pages.

\* cited by examiner

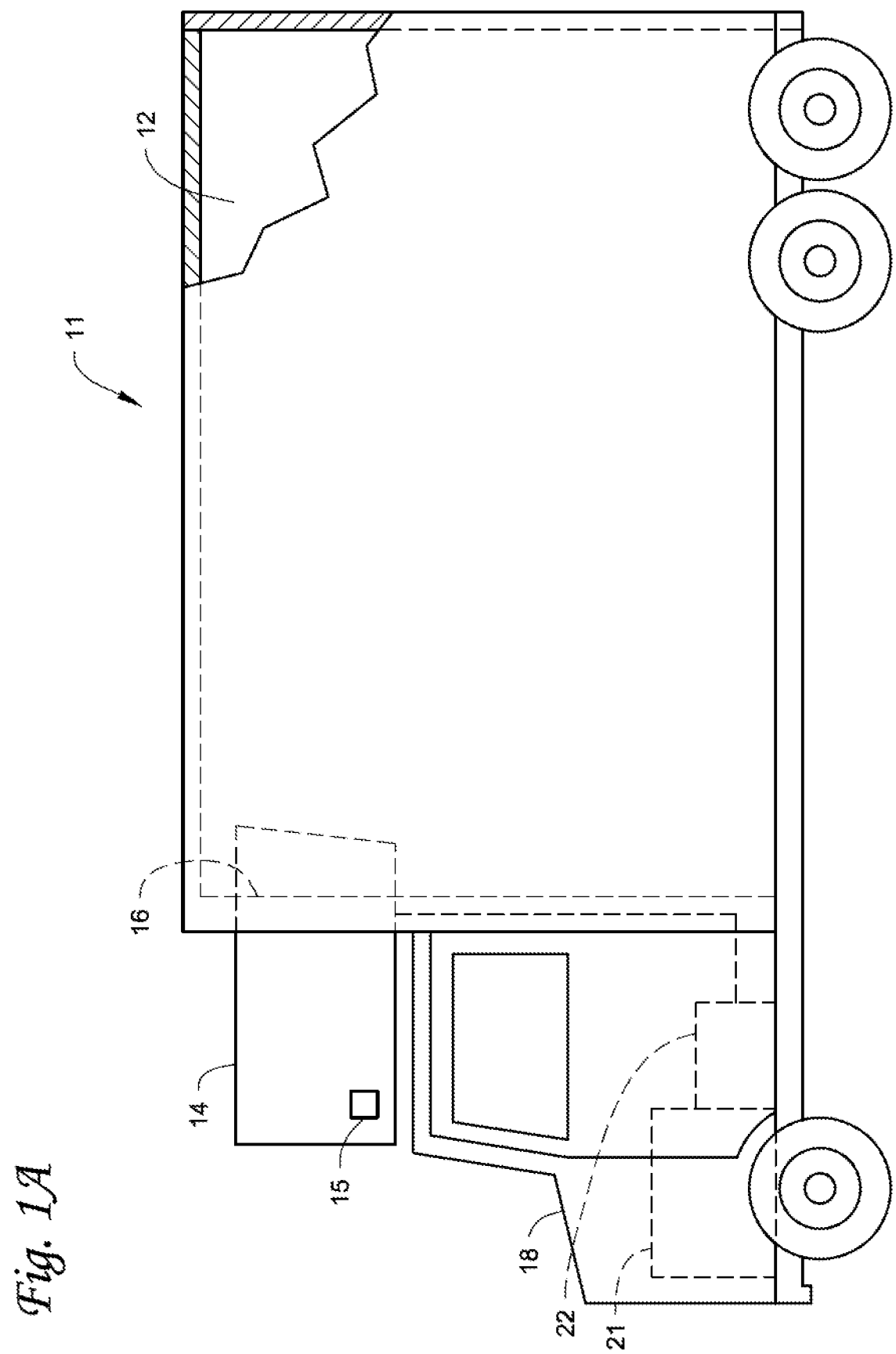

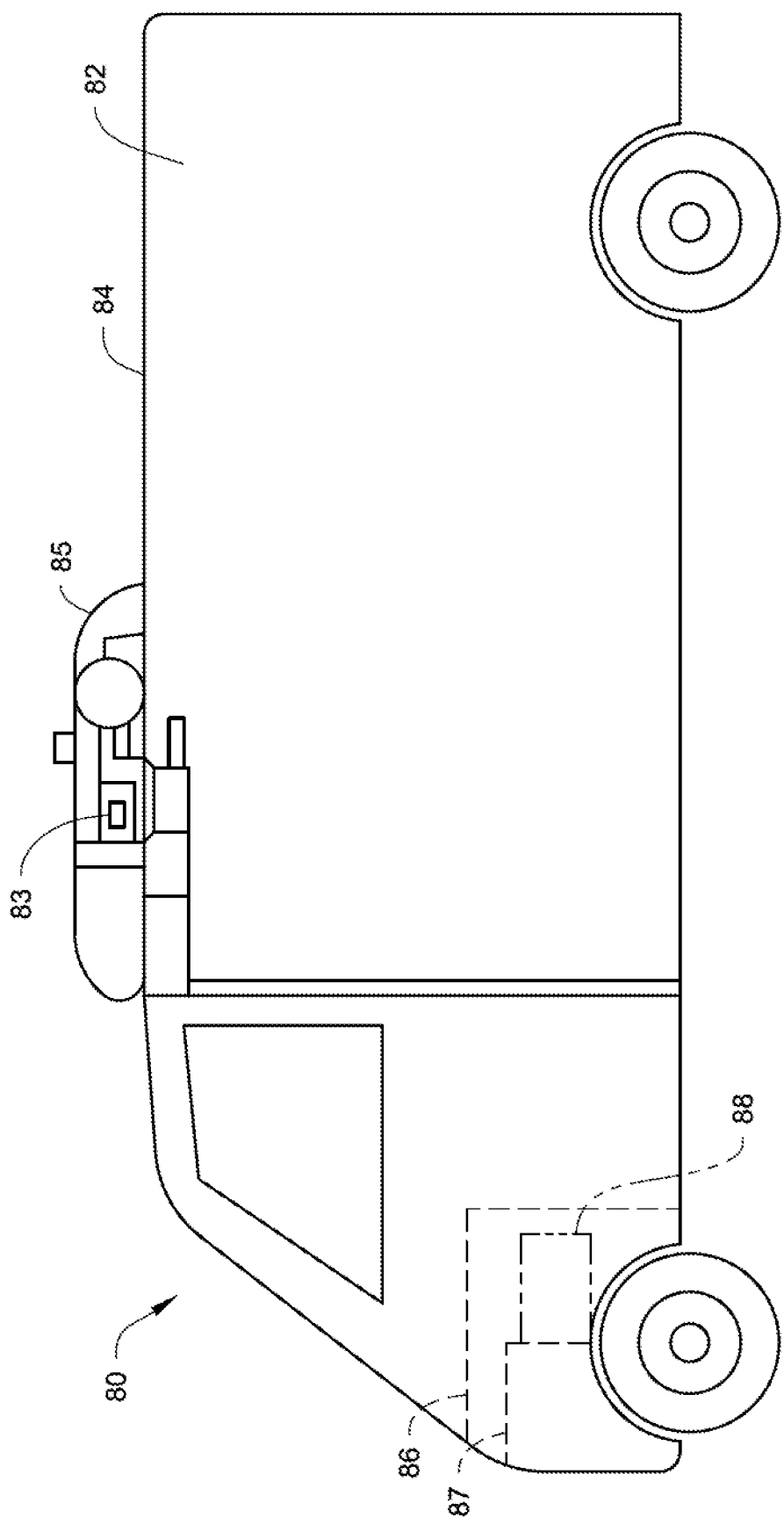

METHODS AND SYSTEMS FOR POWER AND LOAD MANAGEMENT OF A TRANSPORT CLIMATE CONTROL SYSTEM

FIELD

This disclosure relates to methods and systems for power and load management of a transport climate control system.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.) In some embodiments, the transport unit can include a HVAC system to control a climate within a passenger space of the vehicle.

SUMMARY

This disclosure relates to methods and systems for power and load management of a transport climate control system.

The embodiments described herein provide a vehicle electrical system. The vehicle electrical system includes a vehicle power network that powers a vehicle and can also be configured to power components (also referred herein as "loads") of a transport climate control system attached to the vehicle. The vehicle power network can include one or more power sources having varying levels of power available at any given time.

The embodiments described herein can manage power demands from the components of the transport climate control system based on the varying levels of power of the vehicle power network in order to maintain proper operation of the vehicle. The embodiments described herein can manage power demands from the components of the transport climate control system when an auxiliary power network is available or is not available.

The embodiments described herein can prevent failure of the vehicle power network when demand from load components of the transport climate control system exceeds the available power capacity.

The embodiments described herein can also provide efficient use an auxiliary power network in combination with a vehicle power network.

This disclosure discloses a vehicle electrical system for managing loads and multiple energy sources to allow for power and load management of the transport climate control system (also referred to as a HVAC-R system) even if a vehicle power source (for example, the prime mover) is off or unable to fully power the transport climate control system ("holdover"). In addition, the vehicle electrical system can provide a boost to the vehicle power using an auxiliary energy source (e.g., auxiliary battery) when the vehicle power (for example, from the prime mover) is insufficient.

It will be appreciated that there can be multiple reasons for why the vehicle power network can be limited. For example, when the vehicle power network includes a vehicle alternator, the vehicle alternator might not be rated for the capacity needed for loads of the transport climate control load network. Another example is that when the vehicle is slowing down (e.g., the vehicle is not running a full speed), the vehicle alternator may not be operating to supply a full capacity (for example, the vehicle alternator can be provided with 70% or 65% of the rated capacity). For example, the vehicle alternator at 100 A can only provide 70 A or 65 A as the vehicle is slowing down. For the vehicle equipped with auto start-stop system (for example, to comply with the EU emission standards), the vehicle can shut down completely when the vehicle comes to a standstill stop (i.e., the vehicle alternator provides no current).

Regulations to reduce emissions (e.g., particulate matter emissions, nitrogen oxide emissions, noise emissions, etc.), for example, from a vehicle prime mover (e.g., a combustion engine such as a diesel engine, etc.), have led to components within the vehicle being electrically driven and the addition of emission reducing components (e.g., emission control devices, an auto start-stop system, etc.) in the space between the vehicle alternator and the prime mover within a vehicle power bay. The auto start-stop system can shut the prime mover off (i.e., the prime mover is not running) when, for example, the vehicle stops at a traffic light, stops at a store, etc. Accordingly, the amount of space between the vehicle alternator and the prime mover in the vehicle power bay that is available for other components is shrinking. For example, this reduced space can make it difficult to provide a separate compressor coupled to (or tied to, mounted to) the prime mover in the vehicle power bay to provide for high cooling power load and supplement a transport climate control system.

The embodiments described herein can provide a transport climate control system that can be electrically driven by power (for example, a 12V DC power) from a vehicle power network. Also, the embodiments described herein can control loads of the transport climate control system) so as to prevent failure of one or more power sources of a vehicle power network of a vehicle electrical system. In particular, the embodiments described herein can ensure that the vehicle power network can maintain proper of a vehicle that it powers by managing the amount of power supplied to loads of the transport climate control system. The embodiments described herein can effectively manage multiple loads of the transport climate control system.

Also, the embodiments described herein can provide climate control within an internal space using a compressor that is disposed outside of the vehicle power bay and is driven by an electric drive. This can prevent the need for a compressor in the vehicle power bay and thereby increase the amount of space available in the vehicle power bay and can allow the separate compressor to operate even when the vehicle prime mover off.

In one embodiment, a method for power and load management of a transport climate control system using a vehicle electrical system is provided. The vehicle electrical system includes a vehicle power network and an auxiliary battery system connected to a transport climate control load network via a voltage direct current (DC) regulated bus. The method includes a controller determining a power draw of the transport climate control load network, and determining an amount of power available from the vehicle electrical system. Also, the method includes the controller determining whether the power draw of the transport climate control load network exceeds the amount of power available from the vehicle electrical system. The method also includes shedding one or more loads of the transport climate control load network to reduce the power draw of the transport climate control load network until the power draw of the transport climate control load network matches the power available from the vehicle electrical system. Further, the method includes supplying power from the vehicle electrical system to the transport climate control load network.

In another embodiment, a vehicle electrical system for power and load management of a transport climate control system is provided. The vehicle electrical system includes a voltage direct current (DC) regulated bus. Also, the vehicle electrical system includes a vehicle power network configured to generate power from a vehicle and provide the generated power to the voltage DC regulated bus. The vehicle electrical system also includes an auxiliary power network that includes an auxiliary battery system connected to the DC regulated bus, wherein the auxiliary battery system is configured to store power and supply the stored power to the DC regulated bus. Further, the vehicle electrical system includes a transport climate control load network receiving power from the DC regulated bus. The vehicle electrical system further includes a controller configured to determine a power draw of the transport climate control load network, to determine an amount of power available from the vehicle electrical system, and to determine whether the power draw of the transport climate control load network exceeds the amount of power available from the vehicle electrical system. The vehicle electrical system is configured to shed one or more loads of the transport climate control load network to reduce the power draw of the transport climate control load network until the power draw of the transport climate control load network matches the power available from the vehicle electrical system. The vehicle electrical system is also configured to supply power from the vehicle electrical system to the transport climate control load network with the reduced power draw.

BRIEF DESCRIPTION OF THE DRAWINGS

References are made to the accompanying drawings that form a part of this disclosure and which illustrate embodiments in which the systems and methods described in this specification can be practiced.

FIG. 1A illustrates a side view of a truck with a front wall mounted vehicle powered transport refrigeration unit, according to one embodiment.

FIG. 1E illustrates a side view of a van with a roof mounted vehicle powered transport refrigeration unit, according to one embodiment.

Like reference numbers represent like parts throughout.

DETAILED DESCRIPTION

Figure 1B:
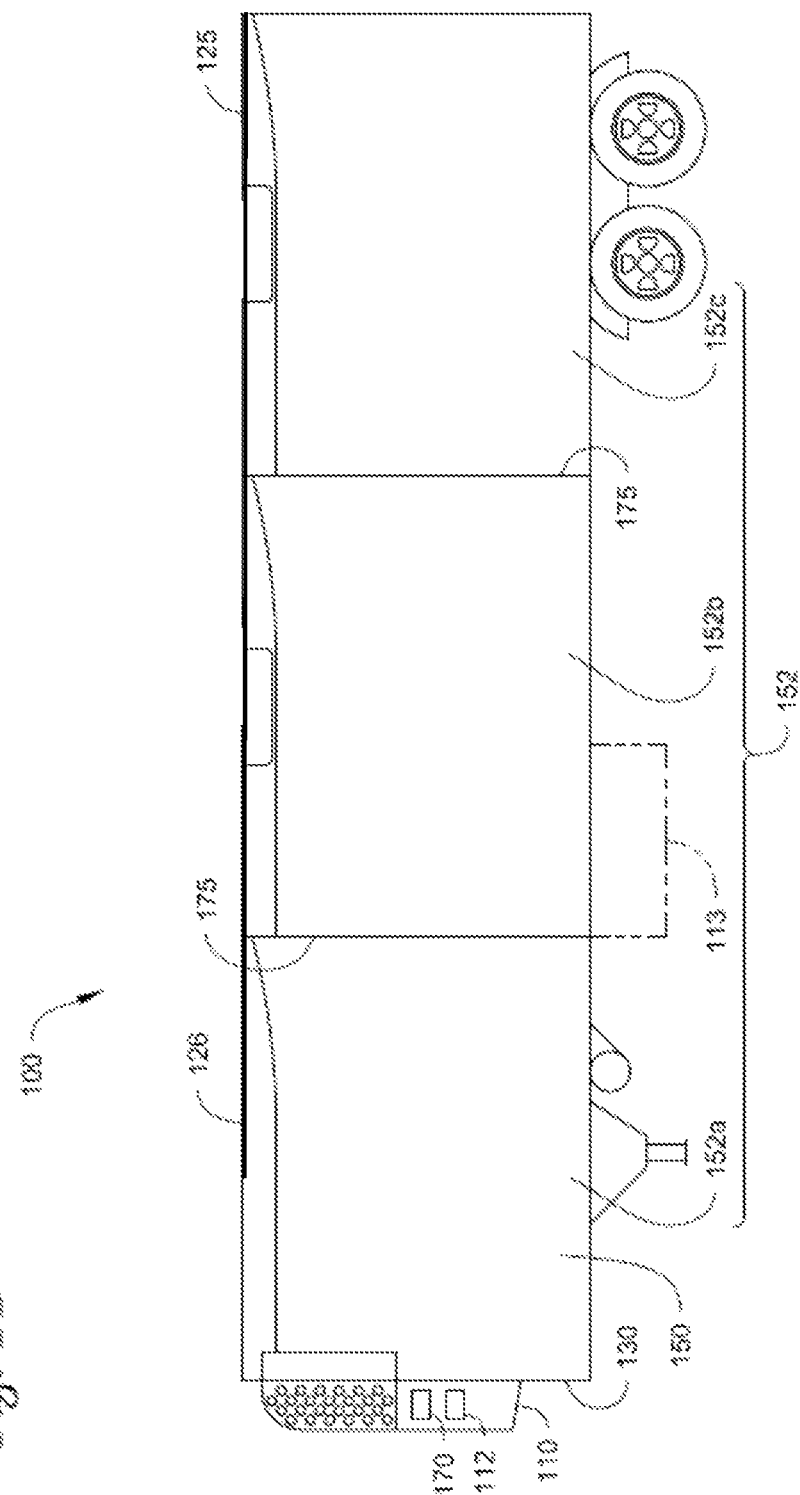
FIG. 1B illustrates a schematic cross sectional side view of a refrigerated transport unit with a multi-temp transport refrigeration system, according to one embodiment.

This disclosure relates to methods and systems for power and load management of a transport climate control system.

The embodiments described herein can be provided in, for example, a transport climate control system such as a TRS or MTRS for a transport unit (TU), an HVAC system for a vehicle, etc.

As defined herein, "low voltage" refers Class A of the ISO 6469-3 in the automotive environment. In particular, a maximum working voltage of between 0V and 60V DC or between 0V and 30V AC.

As defined herein, "high voltage" refers Class B of the ISO 6469-3 in the automotive environment. In particular, a maximum working voltage of between 60V and 1500V DC or between 30V and 1000V AC.

FIG. 1A depicts a temperature-controlled straight truck 11 that includes a conditioned load space 12 for carrying cargo. A transport refrigeration unit (TRU) 14 is mounted to a front wall 16 of the load space 12. The TRU 14 is controlled via a controller 15 to provide temperature control within the load space 12. The truck 11 further includes a vehicle power bay 18, which houses a prime mover 21, such as a combustion engine (e.g., diesel engine, etc.), that provides power to move the truck 11 and to operate the TRU 14. In some embodiments, the prime mover 21 can work in combination with an optional machine 22 (e.g., an alternator) to operate the TRU 14. In one embodiment, the TRU 14 includes a vehicle electrical system (see FIG. 2). Also, in some embodiments, the truck 11 can be a hybrid vehicle that is powered by the prime mover 21 in combination with a battery power source or can be an electrically driven truck in which the prime mover 21 is replaced with an electric power source (e.g., a battery power source).

While FIG. 1A illustrates a temperature-controlled straight truck 11, it will be appreciated that the embodiments described herein can also apply to any other type of transport unit including, but not limited to, a container (such as a container on a flat car, an intermodal container, etc.), a box car, or other similar transport unit.

FIG. 1B illustrates one embodiment of a MTRS 100 for a TU 125 that can be towed, for example, by a tractor (not shown). The MTRS 100 includes a TRU 110 that provides environmental control (e.g. temperature, humidity, air quality, etc.) within an internal space 150 of the TU 125. The MTRS 100 also includes a MTRS controller 170 and one or more sensors (e.g., Hall effect sensors, current transducers, etc.) (see FIG. 2) that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1B, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, etc. Also, the prime mover can be a combustion engine or a microturbine engine and can operate as a two speed prime mover, a variable speed prime mover, etc. The power module 112 can provide power to, for example, the MTRS Controller 170, a compressor (not shown), a plurality of DC (Direct Current) components (not shown), a power management unit (see FIG. 2), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (see FIG. 2), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal space 150 can be divided into a plurality of zones 152 (152a, 152b, 152c). The term "zone" means a part of an area of the internal space 150 separated by walls 175. It will be appreciated that the invention disclosed herein can also be used in a single zone TRS.

In some embodiments, the MTRS 100 for the TU 125 can include a TRS. In some embodiments, an HVAC system can be powered by an Auxiliary Power Unit (APU, see FIGS. 1C and 1D). The APU can be operated when a main prime mover of the TU 125 is turned off such as, for example, when a driver parks the TU 125 for an extended period of time to rest. The APU can provide, for example, power to operate a secondary HVAC system to provide conditioned air to a cabin of the TU 125. The APU can also provide power to operate cabin accessories within the cabin such as a television, a microwave, a coffee maker, a refrigerator, etc. The APU can be a mechanically driven APU (e.g., prime mover driven) or an electrically driven APU (e.g., battery driven).

The tractor includes a vehicle electrical system (see FIG. 2) for supplying electrical power to the electrical loads of the tractor, the MTRS 100, and/or the TU 125.

Figure 1C:
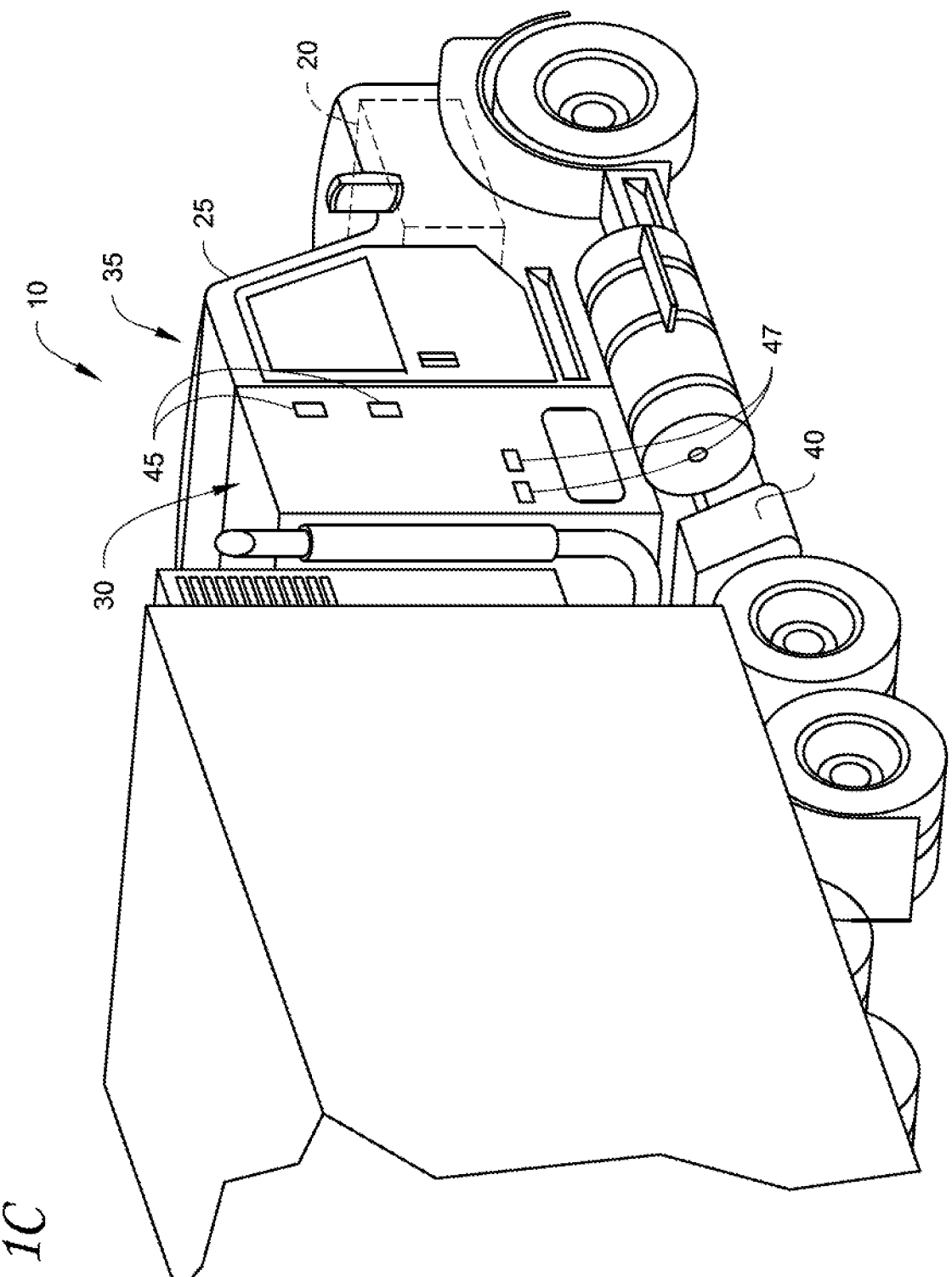
FIG. 1C illustrates a perspective view of a vehicle with an APU, according to one embodiment.

FIG. 1C illustrates a vehicle 10 according to one embodiment. The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the invention's application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU 40, and a plurality of vehicle accessory components 45 (e.g., electronic communication devices, cabin lights, a primary and/or secondary HVAC system, primary and/or secondary HVAC fan(s), sunshade(s) for a window/windshield of the vehicle 10, cabin accessories, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, a refrigerator, a television, a video game console, a microwave, device charging station(s), a continuous positive airway pressure (CPAP) machine, a coffee maker, a secondary HVAC system for providing conditioned air to the sleeping portion 30.

The primary power source 20 can provide sufficient power to operate (e.g., drive) the vehicle 10 and any of the plurality of vehicle accessory components 45 and cabin accessory components 47. The primary power source 20 can also provide power to the primary HVAC system and the secondary HVAC system. In some embodiments, the primary power source can be a prime mover such as, for example, a combustion engine (e.g., a diesel engine, etc.).

The APU 40 is a secondary power unit for the vehicle 10 when the primary power source 20 is unavailable. When, for example, the primary power source 20 is unavailable, the APU 40 can be configured to provide power to one or more of the vehicle accessory components, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10. The APU 40 can be controlled by an APU controller 41.

Figure 1D:
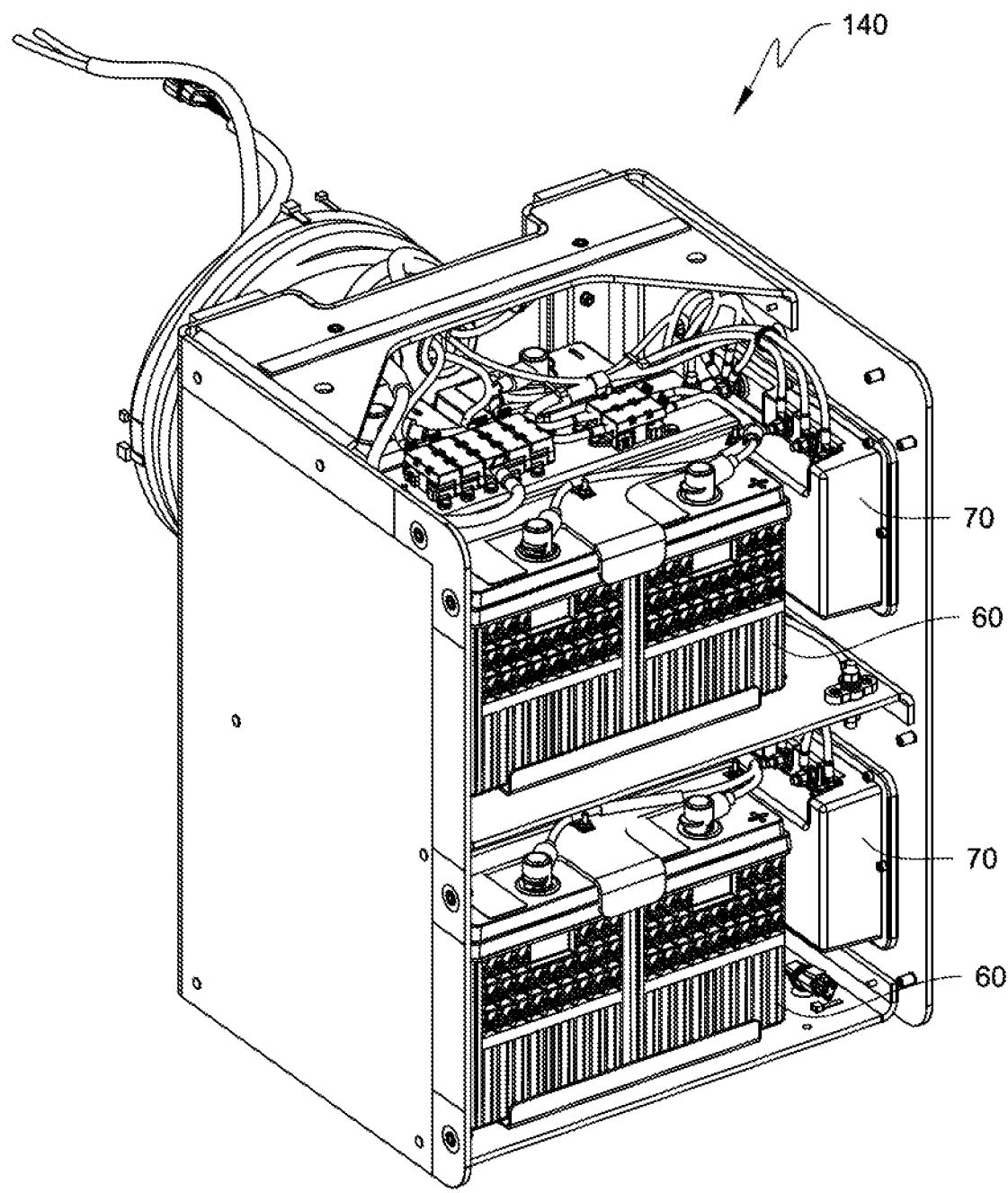
FIG. 1D illustrates a front perspective view of an APU, according to one embodiment.

FIG. 1D illustrates an electric APU 140 that can be used with a vehicle (e.g., the vehicle 10 shown in FIG. 1C), according to one embodiment. The APU 140 includes a plurality of energy storage elements 60 each of which is coupled to one of a plurality of converters 70. The converters 70 can provide electric power (e.g., AC or DC power) generated by the APU 140 to one or more vehicle accessory components, cabin accessory components, a primary HVAC system, and a secondary HVAC system. A secondary HVAC system can provide conditioned air to a sleeping portion of a vehicle cabin (e.g., the sleeping portion 30 of the cabin 25 shown in FIG. 1C). The energy storage elements 60 can be, for example, battery packs, fuel cells, etc. In some embodiments, the APU 140 can be turned on or off by an occupant (e.g., driver or passenger) of the vehicle. For example, the occupant can turn on the APU 140 to provide power stored in the energy storage elements 60 when a primary power source of the vehicle is turned off. It will be appreciated that the embodiments described herein can also be used with a prime mover powered APU.

Figure 2:
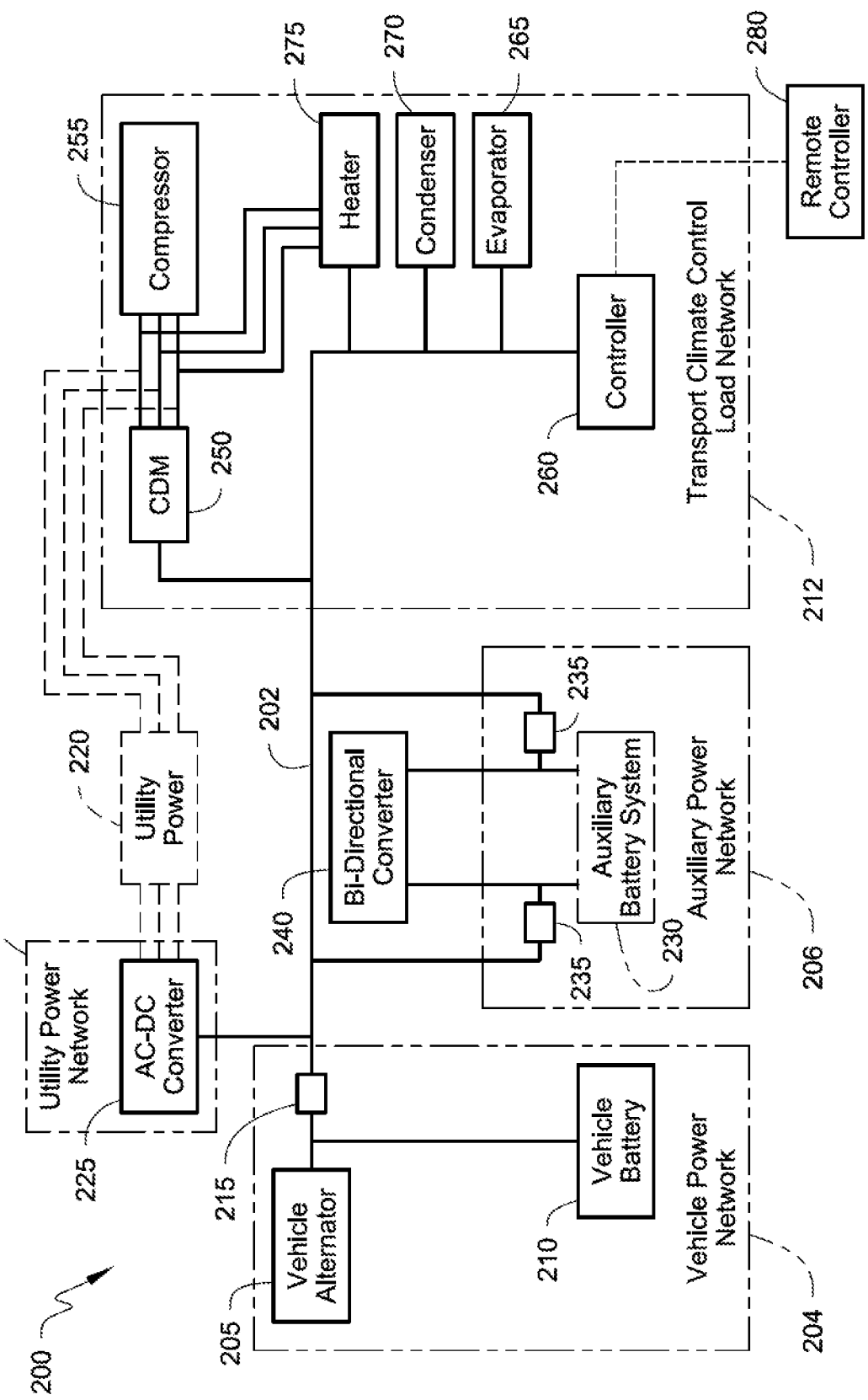
FIG. 2 illustrates a block diagram schematic of one embodiment of a vehicle electrical system of a climate control system, according to one embodiment.

In some embodiments, the APU (e.g., the APU 40 as shown in FIG. 1C and/or the APU 140 as shown in FIG. 1D) includes a vehicle electrical system (see FIG. 2).

FIG. 1E depicts a temperature-controlled van 80 that includes a conditioned load space 82 for carrying cargo. A transport refrigeration unit (TRU) 85 is mounted to a rooftop 84 of the load space 82. The TRU 85 is controlled via a controller 83 to provide temperature control within the load space 82. The van 80 further includes a vehicle power bay 86, which houses a prime mover 87, such as a combustion engine (e.g., diesel engine, etc.), that provides power to move the van 80 and to operate the TRU 85. In some embodiments, the prime mover 87 can work in combination with an optional machine 88 (e.g., an alternator) to operate the TRU 85. In one embodiment, the TRU 85 includes a vehicle electrical system (see FIG. 2). Also, in some embodiments, the van 80 can be a hybrid vehicle that is powered by the prime mover 87 in combination with a battery power source or can be an electrically driven truck in which the prime mover 87 is replaced with an electric power source (e.g., a battery power source).

FIG. 2 illustrates a block diagram schematic of one embodiment of a vehicle electrical system 200. The vehicle electrical system 200 can be provided, for example, in the TRU 14 shown in FIG. 1A to supply electrical power to the TRU 14. Also, the vehicle electrical system 200 can be provided to supply electrical power to the electrical loads of the tractor, the MTRS 100, and/or the TU 125 shown in FIG. 1B. The vehicle electrical system 200 can also be provided as part of an APU (e.g., the APU 40 shown in FIG. 1C and/or the APU 140 shown in FIG. 1D) to supply electrical power to one or more loads connected to the APU. The vehicle electrical system 200 shown in FIG. 2 is configured to operate with a prime mover powered vehicle. However, it will be appreciated that the vehicle electrical system 200 can also be configured to operate with an electric vehicle powered by an energy storage device (e.g., one or more batteries) and/or a hybrid vehicle powered by a combination of a prime mover and an energy storage device.

As shown in FIG. 2, the vehicle electrical system 200 includes a DC regulated bus 202 electrically connecting a vehicle power network 204, an auxiliary power network 206, a utility power network 208, a bi-directional voltage converter 240 and a transport climate control load network 212. In some embodiments, the DC regulated bus 202 can be a 12 volts DC regulated bus. It will be appreciated that "regulated" is a term of art. For example, a regulated power supply can convert unregulated AC (Alternating Current) supply into a constant DC, with the help of a rectifier (or an AC-DC converter, or the like), and can supply a stable voltage (or current in some situations), to a circuit or device that need to be operated within certain power supply limits. It will also be appreciated that on a 12 volt regulated bus, the voltage provided to the bus can vary, for example, between about 11 volts to about 15 volts. In some embodiments, the DC regulated bus 202 can travel from a vehicle power bay to a cab of the vehicle, to a TRU, and/or to an APU.

The vehicle electrical system 200 can manage and regulate energy from one or more energy sources from the vehicle power network 204, the auxiliary power network 206 and/or the utility power network 208 to the transport climate control load network 212 via the bi-directional voltage converter 240. The one or more energy sources can include a vehicle battery 210 and an vehicle alternator 205 via the vehicle power network 204, a utility power 220 (also referred to as a shore power source) via the utility power network 208, and/or an auxiliary power network 206 including an optional auxiliary battery system 230. Also, the vehicle electrical system 200 is configured to supply energy to one or more loads from the transport climate control load network 212. The loads can be, for example, a compressor 255, one or more evaporator blowers 265, one or more condenser fans 270, a heater 275, and a controller 260 of a transport climate control system.

The vehicle power network 204 includes the vehicle battery 210, the vehicle alternator 205 and a vehicle isolator 215 disposed between the vehicle alternator 205 and the vehicle battery 210 at one end and the DC regulated bus 202 at a second end. The vehicle battery 210 can be used, for example, for starting a vehicle prime mover, running lights, powering vehicle accessory components, etc. In some embodiments, the vehicle battery 210 can also be used to power components of the transport climate control load network 208. The vehicle battery 210 and the vehicle alternator 205 are connected to the DC regulated bus 202 via a vehicle isolator 215. In one embodiment, the vehicle isolator 215 can be a switch controlled by the controller 260 that isolates the bi-directional voltage converter 240 from receiving energy from the vehicle power network 204.

The vehicle alternator 205 can be an electrical alternator that can provide AC power to the vehicle. In some embodiments, the vehicle alternator 205 can include a rectifier or an AC-DC converter (not shown) that rectifies or converts the AC power to a DC power. The vehicle alternator 205 is connected to the DC regulated bus 202 via the vehicle isolator 215. The vehicle alternator 205 can provide the rectified or converted DC power (for example, 12V) to the DC regulated bus 202.

It will be appreciated that in electric vehicles, there may be no alternator. Electric vehicles can include a motor generator and a high voltage (e.g., in a range between 60V and 1500V; for example 400V, 800V, etc.) DC battery to run the vehicle. Electric vehicles can also provide a relatively high voltage (e.g., 400V, 800V, etc.) DC power source (e.g., a battery pack, a rechargeable energy storage system (RESS), etc.). Electric vehicles can include one or more DC-DC converters (e.g., two DC-DC convertors) to convert the relatively high voltage (e.g., 400V, 800V, etc.) to a low voltage (e.g., in a range between 0V and 60V; for example 12V). That is, the vehicle alternator 205 can be replaced with a DC-DC converter having similar parameters as the vehicle alternator 205 in order to be able to provide a low voltage to the DC regulated bus 202 and power one or more loads of the transport climate control load network 212. The converted low voltage (e.g. 12V) can be used to power vehicle accessory components (e.g., electronic communication devices, cabin lights, a primary and/or secondary HVAC system, primary and/or secondary HVAC fan(s), sunshade(s) for a window/windshield of the vehicle 10, cabin accessories, etc.). In some embodiments, the converted low voltage (e.g. 12V) can be provided to the DC regulated bus 202 for powering the transport climate control load network 212. In some embodiments, an electric vehicle can provide for example, 7 kW-Hour energy from a 45 kW-Hour storage of the vehicle power network 204 to run the transport climate control load network 212. It will be appreciated that the embodiments disclosed herein is directed to a low voltage (e.g., 12V) system. Embodiments disclosed herein can use take off power (e.g., electric power take off or ePTO) from the low voltage (for example, 12V) system for loads such as vehicle accessory components and/or the transport climate control load network 212. The high voltage power can provide power for driving the vehicle (e.g., transmission power take off) and the embodiments disclosed herein may not take electric power from the high voltage system.

It will be appreciated that in a hybrid vehicle, there may be an alternator (such as the vehicle alternator 205) and/or a low voltage DC power source that can provide a low voltage (e.g., 12V) to the DC regulated bus 202.

It will be appreciated that any type of power source from the vehicle that can provide power to the vehicle electrical system 200 can be part of the vehicle power network 204. This can include, for example, the vehicle alternator 205, the vehicle battery 210, a RESS, a generator, an axle-mounted generator, a power take off (PTO) device or ePTO device with an auxiliary converter, etc.

In some embodiments, a voltage sensor (not shown) can be provided in the vehicle power network 204 to monitor a vehicle voltage provided to the DC regulated bus 202. Also, in some embodiments, a current sensor (not shown) can be provided in series with the vehicle isolator 215 to monitor the current to and from the auxiliary power network 206.

The utility power network 208 includes the AC-DC converter 225. A utility power (e.g., Utility power, etc.) 220 can be connected to the AC-DC converter 225 to provide AC power input to the AC-DC converter 225. The AC-DC converter 225 converts the AC power from the utility power 220 and provides converted DC power to the DC regulated bus 202. In one embodiment, the converted DC power from the AC-DC converter 225 to the DC regulated bus 202 can be, for example, 12 volts and 84 amps. While FIG. 2 shows a single AC-DC converter 225, it is appreciated that in other embodiments the vehicle electrical system 200 can includes two or more AC-DC converters. In embodiments where there are two or more AC-DC converters, each of the AC-DC converters can be connected to the utility power 220 to provide additional power capacity to the vehicle electrical system 200. In some embodiments, each of the AC-DC converters can provide different amounts of power. In some embodiments, each of the AC-DC converters can provide the same amount of power.

The auxiliary power network 206 includes an optional auxiliary battery system 230 and two auxiliary power on/off switches 235 disposed between the auxiliary battery system 230 and the DC regulated bus 202. In some embodiments, the auxiliary power network 206 can be part of the transport climate control system and potentially housed within a transport refrigeration unit. In other embodiments, the auxiliary power network 206 can be external to the transport climate control system and part of the vehicle power network 204. In yet some other embodiments, the auxiliary power network 206 can be external to the transport climate control system and external to the vehicle power network 204.

In some embodiments, the auxiliary battery system 230 can include a one or more auxiliary batteries (also referred to as hold-over batteries). For example, in one embodiment the auxiliary battery system 230 can include two auxiliary batteries (not shown). Each of the auxiliary batteries can also be connected to the DC regulated bus 202 via the bi-directional voltage converter 240. Also, each of the auxiliary batteries can bypass the bi-directional voltage converter 240 and connect to the DC regulated bus 202 via one of the auxiliary power on/off switches 235. It will be appreciated that the auxiliary battery system 230 can provide sufficient energy to power the transport climate control load network 212 by itself. Each of the auxiliary power on/off switches 235 can be controlled by the controller 260. It will be appreciated that in some embodiments, the vehicle electrical system 200 may not include an auxiliary battery system 230 and/or the auxiliary power network 206.

The bi-directional voltage converter 240 is configured to transfer power from one of the vehicle power network 204, the utility power network 208 and/or the auxiliary power network 206 to the transport climate control load network 212. In some embodiments, the bi-directional voltage converter 240 can be part of an energy management module (e.g., a smart charge module (SCM), etc.). In these embodiments, the bi-directional voltage converter 240 can transfer power from the vehicle power network 204 and/or the utility power network 208 to charge one or more auxiliary batteries of the auxiliary battery system 230. Thus, the bi-directional voltage converter 240 can control current flow along the DC regulated bus 202. In some embodiments, the vehicle electrical system 200 can include two or more bi-directional voltage converters 240 each of which is part of a separate SCM. As described in more detail in FIG. 3, the energy management module can be a DC-DC charger. The bi-directional voltage converter 240 can step-down (buck) and step-up (boost) voltage for power being sent from the vehicle power network 204 and/or the utility power network 208 to the bi-directional voltage converter 240, and from the bi-directional voltage converter 240 to the vehicle power network 204 and/or the utility power network 208. Accordingly, the bi-directional voltage converter 240 can control current direction and current amount along the DC regulated bus 202.

The vehicle electrical system 200, and particularly the bi-directional voltage converter 240, is controlled by the controller 260. The controller 260 can be, for example, the TRS controller 15 shown in FIG. 1A, the MTRS controller 170 of FIG. 1B, or the APU controller 41. A remote controller 280 can be connected to the controller 260 wirelessly (e.g., Bluetooth, ZigBee, etc.) or via wire (e.g., a communication link such as a RS485 communication link). The remote controller 280 can be located in a cab of the vehicle and can be controlled by a user, for example, a driver. The remote controller 280 can be used by a user to communicate the user's settings for components of the transport climate control load network 212 to the controller 260.

Components of the transport climate control load network 212 can be, for example, part of a TRU that is mounted to the body of the vehicle (for example, truck). In some embodiments, the TRU can be above the cab of the truck. In another embodiment, the TRU can be on the top of the TU (for example, a top of a box where the external condensers are located). The transport climate control load network 212 includes a Compressor Drive Module (CDM) 250 that drives the compressor 255, one or more evaporator blowers 265, one or more condenser fans 270, the heater 275, and the controller 260. The DC regulated bus 202 is connected to and powers each of the CDM 250, the one or more evaporator blowers 265, the one or more condenser fans 270, the heater 275, and the controller 260. It will be appreciated that the CDM 250 and the compressor 255 can require the most power of the various loads of the transport climate control load network 212.

The CDM 250 is configured to boost power from the DC regulated bus 202 and converts the power to AC power to drive the compressor 255. In some embodiments, the CDM 250 can convert the voltage DC power (for example, 12V) from the DC regulated bus 202 and provide, for example, 240V AC power to drive the compressor 255. In particular, the CDM 250 drives the compressor 255 to meet demand of the transport climate control system. When the vehicle alternator 205 alone cannot supply sufficient current to the transport climate control load network 212, the CDM 250 can cause the vehicle voltage to droop. In some embodiments, the CDM 250 includes a DC-DC-AC converter in which the CDM 250 boosts the voltage from the DC regulated bus to a higher DC voltage and then converts the higher DC voltage to an AC voltage.

In some embodiments, the utility power 220 can be connected directly to the compressor 255 and provide power to drive the compressor 255 thereby bypassing the CDM 250. In some embodiments, the CDM 250 can be used as an AC-DC converter and convert power received from the utility power 220 into DC power that can be provided by the CDM 250 to the DC regulated bus 202.

In some embodiments, the compressor 255 can be a variable speed compressor. In some embodiments, the compressor 255 can require, for example, 1 KW of power to operate. In some embodiments, the one or more evaporator blowers 265 can require, for example, 100 W of power to operate. In some embodiments, the one or more condenser fans 270 can require, for example, 130 W of power to operate. In some embodiments, the heater 275 can require, for example, 1200 W of power to operate. Also, in some embodiments, the heater 275 can be configured to receive power from the CDM 250.

When the compressor 255 and/or the heater 275 are powered directly by the utility power 220, the compressor 255 and/or the heater 275 can be turned on and off (e.g., operate in a cycle sentry mode) in order to control the amount of cooling provided by the compressor 255 and/or the amount of heating provided by the heater 275.

Figure 3:
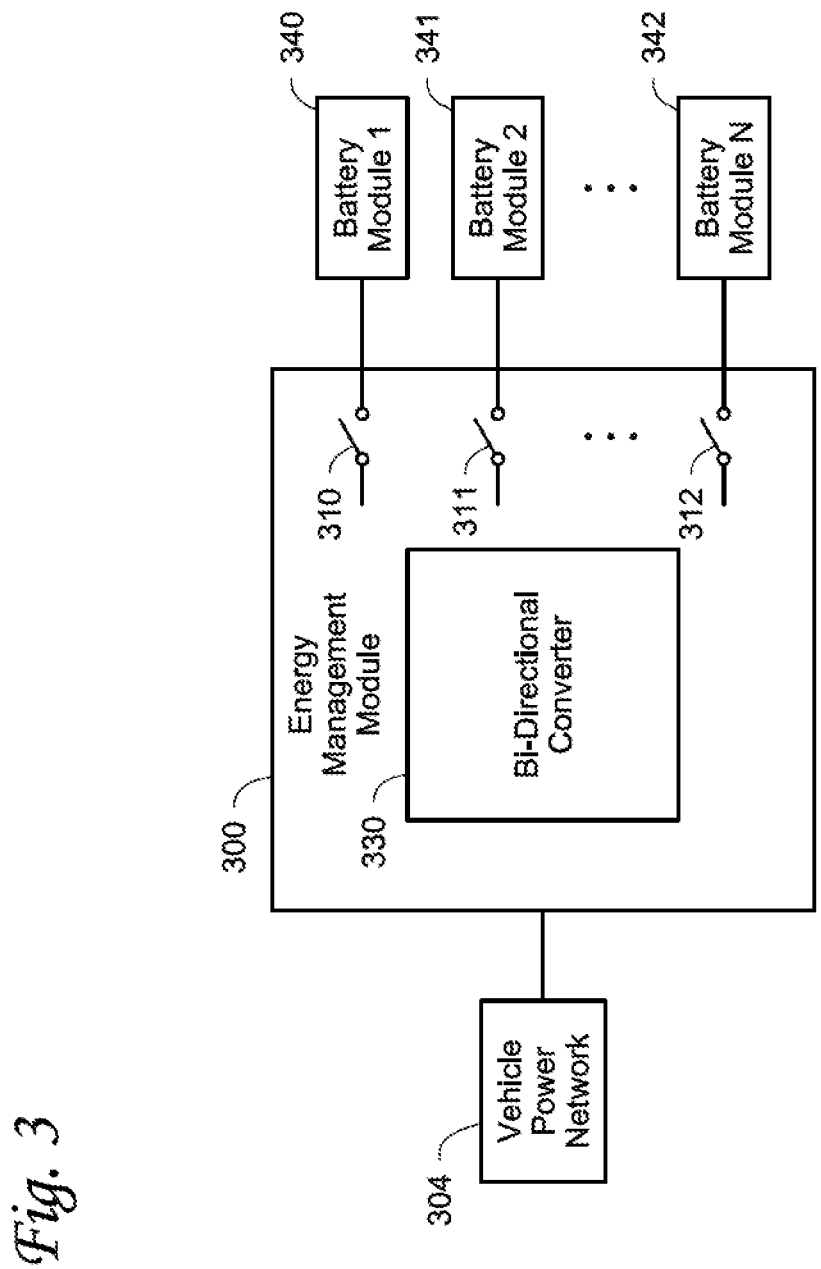
FIG. 3 illustrates a block diagram schematic of one embodiment of an Energy Management Module, according to one embodiment.

FIG. 3 illustrates a block diagram schematic of one embodiment of an energy management module 300. A vehicle power network 304 is electrically connected to the energy management module 300. The vehicle power network 304 can include one or more vehicle power sources such as, for example, a vehicle alternator (e.g., the vehicle alternator 205), a vehicle battery (e.g., the vehicle battery 210), etc. The energy management module 300 includes a bi-directional voltage converter 330. The bi-directional voltage converter 330 can be, for example, the bi-directional voltage converter 240 shown in FIG. 2. The bi-directional voltage converter 330 can step-down (buck) and step-up (boost) voltage for power being sent from the vehicle power network 304 to the energy management module 300 and from the energy management module 300 to the vehicle power network 304. Accordingly, the bi-directional voltage converter 240 can control current direction and current amount along a DC regulated bus of a vehicle electrical system. Detailed descriptions on some embodiments of the bi-directional voltage converters can be found in, for example, U.S. Pat. Nos. 8,441,228; 8,541,905; 9,199,543; and 9,102,241. The energy management module 300 includes a plurality of electric switches 310, 311, and 312. Each of the electric switches 310, 311, and 312 connects to (or disconnects from) a corresponding battery module 340, 341, and 342, respectively. The battery modules 340, 341, and 342 can be, for example, the auxiliary battery system 230 shown in FIG. 2.

In some embodiments, the plurality of electric switches 310, 311, and 312 can be battery relays, electronic switches, etc. In some embodiments, the electronic switches 310, 311, and 312 can be, for example, semiconductor (solid-state) switches such as SmartFET type switches. SmartFET type switches can be field-effect transistor (FET) switches that have smart built-in features such as diagnosis and protection capabilities. In some embodiments, one or more of the battery modules 340, 341, and 342 can be an auxiliary battery used to power components of the transport climate control load network 212. In some embodiments, the plurality of electric switches 310, 311, and 312 is configured to selectively connect one or more of the battery modules 340, 341, and 342 to the bi-directional voltage converter 330 so that at any given time, a subset of the battery modules 340, 341, and 342 connects to the bi-directional voltage converter 330. A controller (such as, for example, the controller 260 shown in FIG. 2) can be configured to control the plurality of electric switches 310, 311, 312 to selectively connect one or more of the battery modules 340, 341, and 342 to the bi-directional voltage converter 330.

It will be appreciated that in certain embodiments, the plurality of electric switches 310, 311, and 312 can be configured to selectively connect more than one of the battery modules 340, 341, and 342 to the bi-directional voltage converter 330. It will also be appreciated that the plurality of electric switches 310, 311, and 312 can be a single battery relay or a single electronic switch that can be configured to selectively connect one or more of the plurality of battery modules 340, 341, and 342 to the bi-directional voltage converter 330.

The bi-directional voltage converter 330 can connect to a system bus of a vehicle electrical system (such as, for example, the DC regulated bus 202 shown in FIG. 2) so that the selected battery module(s) 340, 341, and 342 can deliver power to electrical loads (such as, for example, components of the transport climate control load network 212 shown in FIG. 2) of the vehicle electrical system or can be charged by other power sources. A controller (for example, the controller 260 shown in FIG. 2) can control/switch a plurality of switches (not shown) of the bi-directional voltage converter 330 to control when and where the bi-directional voltage converter 330 directs current (for example, from the selected battery module 340, 341, 342 to the electrical loads in a discharging mode, or from other power source to the selected battery module 340, 341, 342 in a charging mode).

It will be appreciated that the plurality of battery modules 340, 341, 342 of the energy management module 300 can charge (i.e., deliver power to) battery module(s) of another energy management module, or vice versa, to balance the power/energy stored in the battery module(s) of each energy management module. It will further be appreciated that battery module(s) of different energy management modules can be combined/selected until the total power-delivery capacity (e.g. measured in peak amperes at a given voltage, such as 12 volts) is sufficient for supplying the power needs of the vehicle electrical system. The selected battery module(s) of different energy management modules can provide adequate power to the electrical loads of the vehicle electrical system based on the load draw.

Generally, the selected battery module(s) of different energy management modules receive power from one or more power sources during a charge phase, and discharges power to the electrical loads of the vehicle electrical system during a discharge phase. A charge phase may occur when for example, a power source (such as, for example, the utility power network 208 shown in FIG. 2) provides power to the vehicle electrical system of the vehicle, and a discharge phase may occur when for example, the power source is not providing power to the vehicle electrical system of the vehicle (for example, when the prime mover (e.g., combustion engine) is stopped and utility power is unavailable). For example, utility power 208 can be used to fill an energy shortfall when the vehicle cannot be run and a temperature control gap between the monitored temperature and a desired setpoint temperature of the internal space conditioned by the transport climate control system is large.

In some embodiments, a controller (e.g., the controller 260 shown in FIG. 2) can send an alert to a driver of the vehicle to request that the vehicle electrical system 200 be connected to the utility power 208 to address the energy shortfall. In some embodiments, the alert can instruct the driver to start the vehicle and run at a fast idle (e.g., raise an idle speed of a prime mover of the vehicle without raising a speed at which the vehicle is moving) or downshift a vehicle prime mover to operate at a higher prime mover RPM so as to prevent a failure of the transport climate control system and to prevent shedding or derating of loads of the transport climate control load network 212. In some embodiments, the controller 260 can instruct the vehicle to start an automatic restart module to start the vehicle and run at a fast idle to prevent failure of the transport climate control system and to prevent shedding or derating of loads of the transport climate control load network 212. In some embodiments, the controller 260 can instruct the vehicle to disable an auto start/stop system of the vehicle prime mover. In some embodiments, the alert can be sent a time period (e.g., 1 to 5 minutes) before any action is taken or required.

The bi-directional voltage converter 330 of the energy management module 300 can transfer power/energy between a power source and the selected battery module(s) 340, 341, and 342. The bi-directional voltage converter 330 is also referred to as a bi-directional multi-battery voltage converter. The bi-directional voltage converter 330 can include a control circuit (not shown). The control circuit can selectively energize one or more of the plurality of electric switches 310, 311, and 312 to connect the selected battery module(s) 340, 341, and 342 with the bi-directional voltage converter 330.

The energy management module 300 can operate in one of three modes: a charge mode, a discharge mode, and a null mode. When in a charge mode, the energy management module 300 can charge one or more of the battery modules 340, 341, and 342 using a power source (for example, the utility power 220 or the vehicle alternator 205 shown in FIG. 2). When in a discharge mode, the energy management module 300 can deliver power from one or more of the battery modules 340, 341, and 342 to the electrical loads (for example, components of the transport climate control load network 212 shown in FIG. 2). In the null mode, the energy management module 300 is configured to prevent current from flowing between any of the battery module 340, 341, and 342 and the rest of the vehicle electrical system. In the null mode, the control circuit is controlled such that none of the battery modules 340, 341, and 342 are energized.

The energy management module 300 operational modes can be determined by the controller (for example, the controller 260 shown in FIG. 2). The controller (for example, the controller 260 shown in FIG. 2) can switch the bi-directional voltage converter 330 ON (enabled) to draw current from a system bus of a vehicle electrical system or OFF (disabled) to prevent the bi-directional voltage converter 330 from drawing current. For example, when the bi-directional voltage converter 330 is switched ON in the charging mode, the bi-directional voltage converter 330 can direct current from one or more power sources to a selected battery module of the plurality of battery modules 340, 341, 342. When the bi-directional voltage converter 330 is switched ON in the discharging mode, the bi-directional voltage converter 330 can direct current from a selected battery module of the plurality of battery modules 340, 341, 342 to one or more electrical loads (e.g., components of the transport climate control load network 212 shown in FIG. 2). When the bi-directional voltage converter 330 is switched OFF, current can be prevented from flowing between the battery modules and the system bus via the bi-directional voltage converter 330.

Figure 4:
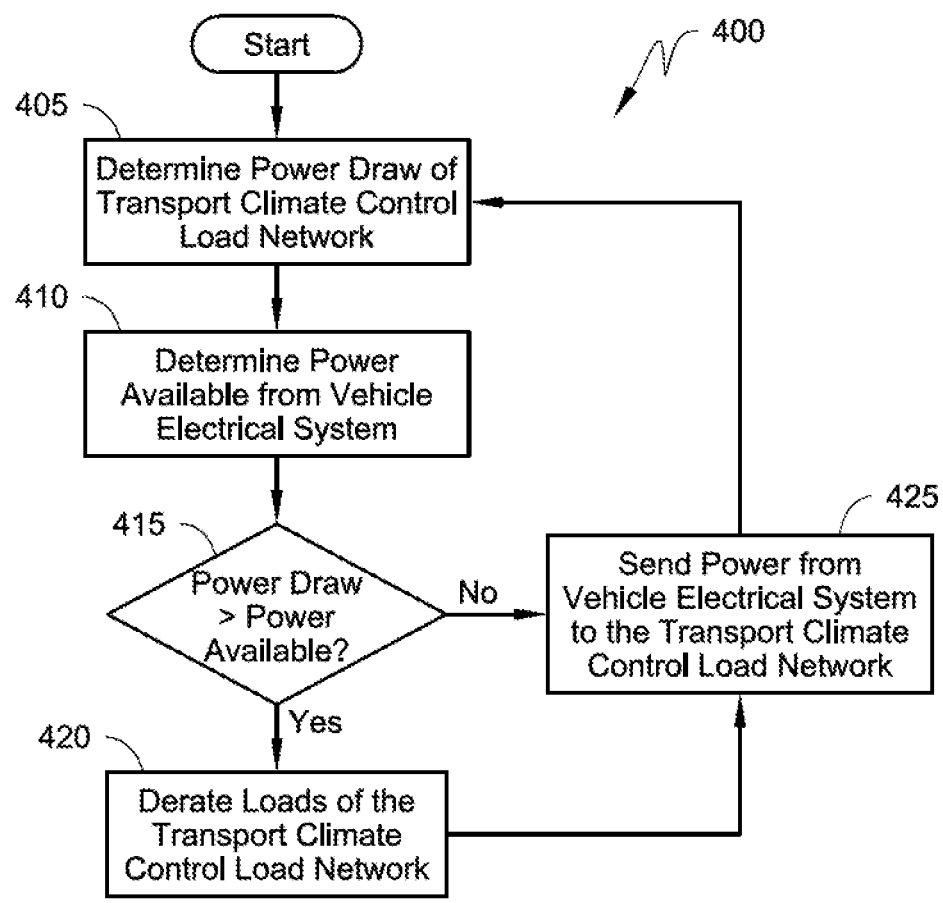
FIG. 4 illustrates a flowchart of a method for power and load management of a transport climate control system using a vehicle electrical system, according to one embodiment.

FIG. 4 illustrates a flowchart of one embodiment of a method 400 for load management of a transport climate control system using the vehicle electrical system 200. The method 400 begins at 405 where the controller 260 determines a power draw of the transport climate control load network 212.

In some embodiments, the controller 260 can store in memory a power rating (i.e., the amount of power used by a component when operating) for each component of the transport climate control load network 212. The controller 260 can monitor the transport climate control load network 212 to determine which components of the transport climate control load network 212 are operating. The controller 260 can access the power rating of those components of the transport climate control load network 212 that are operating and calculate the power draw of the transport climate control load network 212.

In other embodiments, a current sensor can be disposed in the vehicle power network 204 to measure current being sourced by the vehicle electrical system 200 to the load transport climate control load network 212. In these embodiments, the current measurements can be sent to the controller 260. Based on the current measurement, the controller 260 can determine the power draw of the power transport climate control load network 212. The method 400 then proceeds to 410.

In yet some other embodiments, the controller 260 can determine a power draw of the transport climate control load network 212 based on an operational gap of the transport climate control system. For example, a temperature sensor can monitor an internal space temperature of an internal space (e.g., the load space 12 shown in FIG. 1A) of a transport unit that is conditioned using the transport climate control system. The controller 260 then compares the monitored internal space temperature with a desired setpoint temperature of the internal space to obtain an operational gap between the monitored internal space temperature and the desired setpoint temperature. In some embodiments, the operational gap is an absolute difference between the internal space temperature and the desired setpoint temperature of the internal space. Based on the operational gap and the type of cargo stored in the transport unit, the controller 260 can determine the power draw of the transport climate control load network 212.

In some embodiments, the controller 260 can use a lookup table or a set of equations to determine the power draw based on the type of cargo stored in the transport unit. In some embodiments, the controller 260 can make use of operational status data of the transport climate control system (e.g, which loads of the transport climate control load network 212 are used when performing specific operation modes of the transport climate control system, etc.) to determine the power draw. Also, in some embodiments, the controller 260 can make use of other data (e.g., weather data, driving data, etc.) to determine the power draw.

It will be appreciated that the urgency in closing the operational gap can vary based on the type of cargo stored in the transport unit. For example, there may be a higher urgency in keeping the operational gap small when the cargo is a pharmaceutical cargo than when the cargo is a frozen cargo. This is further discussed below with respect to FIG. 5.

At 410, the controller 260 determines an amount of power available from the vehicle electrical system 200. In some embodiments, the controller 260 determines the amount of power available from the vehicle power network 204 when the auxiliary battery system 230 is not being used to supply power to the DC regulated bus 202.

In one implementation, the controller 260 can determine the amount of power available from the vehicle power network 204 using the bi-directional voltage converter 240. In particular, the bi-directional voltage converter 240 can monitor the amount of current supplied onto the DC regulated bus 202 and send the current amount to the controller 260. The controller 260 can then determine the power available from the vehicle power network 204 by taking a difference between the current supplied by the bi-directional voltage converter 240 and a current draw of the transport climate control network 212 obtained based on the power draw of the transport climate control load network 212 determined at 405.

In another implementation, the controller 260 can determine the amount of power available from the vehicle power network 204 based on the vehicle voltage provided by the vehicle power network 204 to the DC regulated bus 202. When one or more loads of the transport climate control network 212 are requiring more power than what is available by, for example, the alternator 205 of the vehicle power network 204, the vehicle voltage has been found to droop from an expected vehicle voltage value. The amount of power available from the vehicle power network 204 can be determined based on the droop in the vehicle voltage. In some embodiments, a voltage sensor is disposed in the vehicle power network 204 to measure the vehicle voltage. The voltage sensor then sends the vehicle voltage measurement to the controller 260.

In some embodiments, the controller 260 determines the amount of power available from the vehicle power network 204 and the auxiliary battery system 230 being used to supply power to the DC regulated bus 202. As discussed above, the controller 260 can determine the amount of power available from the vehicle power network 204 using the bi-directional voltage converter 240 and/or the vehicle voltage provided by the vehicle power network 204 to the DC regulated bus 202. The controller 260 can determine the amount of power available from the auxiliary battery system 230 using the bi-directional voltage converter 240. In particular, the bi-directional voltage converter 240 can determine a charge level of the auxiliary battery system 230 and determine the amount of power available based on the charge level.

In some embodiments, the bi-directional voltage converter 240 may be limited to the amount of current that can be supplied from the vehicle power network 204 in combination with the energy supplied from the auxiliary power network 206. That is, in some embodiments, the bi-directional voltage converter 240 may only be able to handle supplying a limited amount of current from the auxiliary battery system 230 and the vehicle power network 204 to the DC regulated bus 202. In these embodiments, when the controller 260 determines the amount of power available from the vehicle power network 204 and the auxiliary battery system 230 exceeds what the bi-directional voltage converter 240 can handle, the controller 260 can determine that the power available from the vehicle electrical system 200 is limited to the amount of current available by the auxiliary battery system 230.

In some embodiments, the controller 260 determines the amount of power available from the auxiliary battery system 230 being used to supply power to the DC regulated bus 202 when the vehicle power network 204 is not supplying power to the DC regulated bus 202. As discussed above, the controller 260 can determine the amount of power available from the bi-directional voltage converter 240 based on the charge level of the auxiliary battery system 230.

In some embodiments, the controller 260 determines the amount of power available from the utility power network 208 being used to supply power to the DC regulated bus 202 when the utility power network 208 is supplying power to the vehicle electrical system 200. For example, in some embodiments, the controller 260 can determine the amount of power available from the utility power network 208 using the bi-directional voltage converter 240. In particular, the bi-directional voltage converter 240 can monitor the amount of current supplied from the utility power 220 to the bi-directional voltage converter 240 via the DC regulated bus 202 and send the current amount to the controller 260. The controller 260 can then determine the power available from the utility power network 208 by taking a difference between the current supplied by the bi-directional voltage converter 240 and a current draw of the transport climate control network 212 obtained based on the power draw of the transport climate control load network 212 determined at 905. In some embodiments, the controller 260 can determine the amount of power available from the utility power network 208 based on a voltage of the DC regulated bus 202 between the utility power network 208 and the bi-directional voltage converter 240.

It will be appreciated that in some embodiments 405 and 410 can be performed concurrently. Also, in some embodiments, 405 can be performed after 410. The method 400 then proceeds to 415.

At 415, the controller 260 determines whether the power draw of the transport climate control load network 212 exceeds the amount of power available from the vehicle electrical system 200. If the amount of power draw of the transport climate control load network 212 exceeds the amount of power available from the vehicle electrical system 200, the method 400 proceeds to 420. If the amount of power draw of the transport climate control load network 212 does not exceed the amount of power available from the vehicle electrical system 200, the method 400 proceeds to 425.

At 420, the controller 260 is configured to derate one or more loads of the transport climate control load network 212 in order to reduce the power draw of the transport climate control load network 212. That is, the controller 260 can perform a load shedding process of the transport climate control load network 212 to reduce the amount of energy required by the DC regulated bus 202 and thereby the vehicle power network 204 and/or the auxiliary power network 206 based on the amount of energy supplied by the vehicle power network 204 and/or the amount of energy stored in the auxiliary battery system 230. It will be appreciated that in embodiments where the vehicle power network 204 includes the vehicle alternator 205, as the controller 260 sheds or derates one or more loads of the transport climate control load network 212, the vehicle voltage of the vehicle power network 204 may rise due to the decreased power demand on the vehicle alternator 205.

In some embodiments, the controller 260 can instruct the CDM 250 and the compressor 255 to reduce speed in order to reduce the amount of power drawn by the transport climate control load network 212. The amount of speed reduction by the CDM 250 and the compressor 255 can be determined by the controller 260 in order to match or fall below the amount of power available from the vehicle electrical system 200. In some embodiments, the controller 260 can also instruct the one or more evaporator blowers 265, the one or more condenser fans 270 and/or the heater 275 to reduce or stop operation to reduce the amount of power drawn by the transport climate control load network 212. The controller 260 is configured to reduce or stop operation of one or more of the loads of the transport climate control load network 212 in order to match or fall below the amount of power available from the vehicle electrical system 200. The method 420 then proceeds to 425.

At 425, the controller 260 is configured to operate the vehicle electrical system 200 to power the transport climate control load network 212 using one or more of the vehicle power network 204 and the auxiliary battery system 230.

In some embodiments, the controller 260 can be configured to control the vehicle isolator 215 so as to allow the power available from the vehicle power network 204 to be supplied to DC regulated bus 202. In some embodiments, the power available from the vehicle power network 204 can be from the vehicle alternator 205 and/or the vehicle battery 210. The vehicle power network 204 (and thus the vehicle electrical system 200) can provide the power available to the transport climate control load network 212 to operate the transport climate control system to match the power draw of the transport climate control load network 212.

In some embodiments, the controller 260 can be configured to control the vehicle isolator 215 so as to allow power from the vehicle power network 204 to be supplied to the DC regulated bus 202. Also, the controller 260 is configured to control the auxiliary power on/off switches 235 so as to allow power from the auxiliary battery system 230 to be supplied to the to the DC regulated bus 202. The auxiliary battery system 230 can supplement the power provided by the vehicle power network 204 so that the vehicle electrical system 200 can provide the power available to the transport climate control load network 212 to operate the transport climate control system to match the power draw of the transport climate control load network 212.

In embodiments, where the bi-directional voltage converter 240 is limited in the amount of current it can supply, the controller 260 can control the vehicle isolator 215 so as to prevent power from the vehicle power network 204 to be supplied to the DC regulated bus 202 and control the auxiliary power on/off switches 235 so as to allow current from the auxiliary battery system 230 to bypass the bi-directional voltage converter 240 and be supplied to the to the DC regulated bus 202.

In some embodiments, the controller 260 can be configured to control the auxiliary power on/off switches 235 so as to allow the power available from the auxiliary battery system 230 to be supplied to the to the DC regulated bus 202. The controller 260 is also configured to control the vehicle isolator 215 so as to prevent power from the vehicle power network 204 to be supplied to the DC regulated bus 202. The auxiliary battery system 230 (and thus the vehicle electrical system 200) can provide the power available to the transport climate control load network 212 to operate the transport climate control system to match the power draw of the transport climate control load network 212. The method 400 then returns to 405.

FIGS. 5-9 illustrate one implementation of a method for load and power management of a transport climate control system utilizing the load management 400 shown in FIG. 4.

Figure 5:
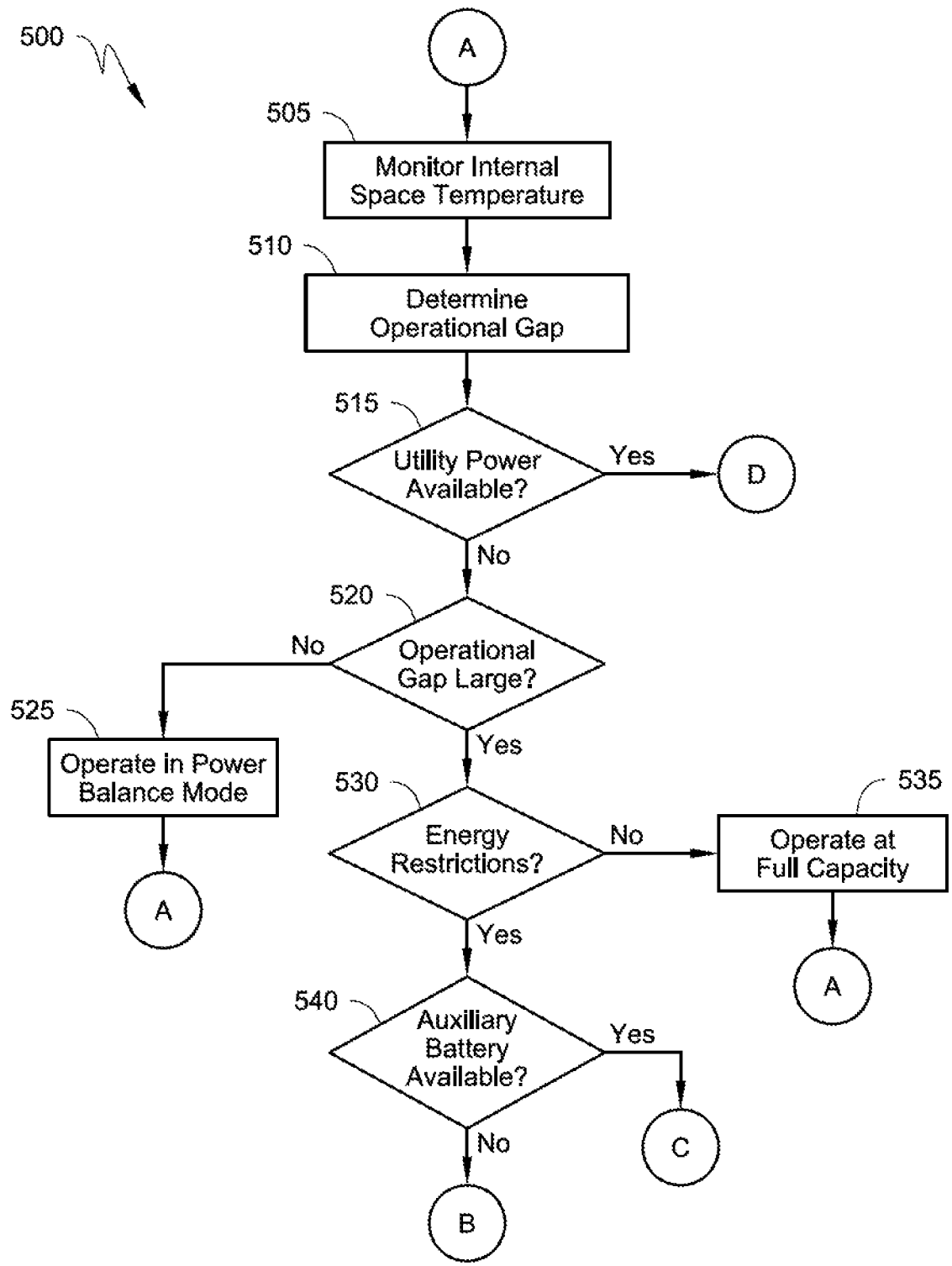
FIG. 5 illustrates a flowchart of a method for operating a transport climate control system using a vehicle electrical system, according to one embodiment.

FIG. 5 illustrates a flowchart of one embodiment of a method 500 for operating a transport climate control system using the vehicle electrical system 200. The method 500 begins at 505 where a temperature sensor monitors an internal space temperature of an internal space (e.g., the load space 12 shown in FIG. 1A) of a transport unit that is conditioned using the transport climate control system. Temperature readings by the temperature sensor are sent to the controller 260. The method 500 then proceeds to 510.

At 510, the controller 260 determines an operational gap between the monitored internal space temperature and a desired setpoint temperature of the internal space. In some embodiments, the operational gap is an absolute difference between the internal space temperature and the desired setpoint temperature of the internal space. The method 500 then proceeds to 515.

At 515, the controller 260 determines whether the utility power 220 is connected to the utility power network 208 such that the utility power network 208 can provide power to the DC regulated bus 202. If the utility power network 208 can provide power to the DC regulated bus 202, the method 500 proceeds to a third power and load management method using the vehicle electrical system at D and discussed below with respect to FIG. 9. If the utility power network 208 cannot provide power to the DC regulated bus 202 (e.g., the utility power 220 is not connected to the utility power network 208), the method 500 proceeds to 520.

At 520, the controller 260 determines whether the operational gap between the monitored internal space temperature and the desired setpoint temperature of the internal space is large. Whether the operational gap is large or small can be based on a gap threshold. The gap threshold can be cargo specific and stored, for example, in a look up table or determined, for example, based on one or more equations in the controller 260. Thus, the gap threshold can be based on the type of cargo being stored in the transport unit. That is, the climate requirements for different cargo can determine the gap threshold used by the controller 260. For example, the gap threshold can be higher (i.e., the operational gap has more margin) for a frozen cargo that is stored in the transport unit than for a pharmaceutical cargo stored in the transport unit that may have a smaller operational gap margin. When the controller 260 determines that the operational gap is not large, the method 500 proceeds to 525. When the controller 260 determines that the operational gap is large, the method 500 proceeds to 530.

At 525, the controller 260 controls the vehicle electrical system 200 to operate in a power balance mode. In particular, the controller 260 manages both the amount of power provided by the vehicle power network 204 and the amount of power drawn by the transport climate control load network 212 to ensure that the amount of power drawn by the transport climate control load network 212 does not exceed the amount of power available from the vehicle power network 204. The power balance mode is discussed in more detail with respect to FIG. 9. The method 500 then returns to A.

At 530, the controller 260 determines whether the vehicle electrical system 200 includes one or more energy restrictions. In some embodiments, the energy restriction(s) can be communicated from a vehicle controller to the controller 260. In some embodiments, the energy restriction(s) can be determined by the controller 260 based on observation of vehicle performance. For example, the controller 260 can monitor a voltage of the vehicle power network 204 to observe vehicle performance. If the vehicle power network 204 includes the alternator 205, the voltage of the vehicle power network 204 may droop when the alternator 205 is being overloaded. The controller 260 can thus determine any energy restriction(s) based on the voltage level of the vehicle power network 204. If the controller 260 determines that the vehicle electrical system 200 does not include an energy restriction, the method 500 proceeds to 535. If the controller 260 determines that the vehicle electrical system 200 includes one or more energy restrictions, the method 500 proceeds to 540.

At 535, the controller 260 instructs the transport climate control system to operate at full capacity. That is, the controller 560 instructs one or more loads of the transport climate control load network 212 to operate as necessary to bring the internal space temperature to the desired setpoint temperature. In particular, the controller 260 is configured to control the vehicle isolator 215 so as to allow power from the vehicle power network 204 to be supplied to DC regulated bus 202. In some embodiments, the power from the vehicle power network 204 can be from the vehicle alternator 205 without depleting charge of the vehicle battery 210. Accordingly, the vehicle electrical system 200 can provide power to the transport climate control load network 212 to operate the transport climate control system as desired. In some embodiments, the controller 260 can instruct the CDM 250 and the compressor 255 to operate at full capacity. In some embodiments, the controller 260 can instruct the one or more evaporator blowers 265, the one or more condenser fans 270 and/or the heater 275 to operate at full capacity. The method 500 then returns to A.

At 540, the controller 260 determines whether the vehicle electrical system 200 includes the optional auxiliary battery system 230 or is otherwise available. As described earlier, in some embodiments the vehicle electrical system 200 may not include the optional auxiliary battery system 230. If the controller 260 determines that the vehicle electrical system 200 does not include the optional auxiliary battery system 230, the method 500 proceeds to a first power and load management method using the vehicle electrical system at B and discussed below with respect to FIG. 6. If the controller 260 determines that the vehicle auxiliary system 200 does include the optional auxiliary battery system 230, the method 500 proceeds to a second power and load management method using the vehicle electrical system 200 at C and discussed below with respect to FIG. 7.

Figure 6:
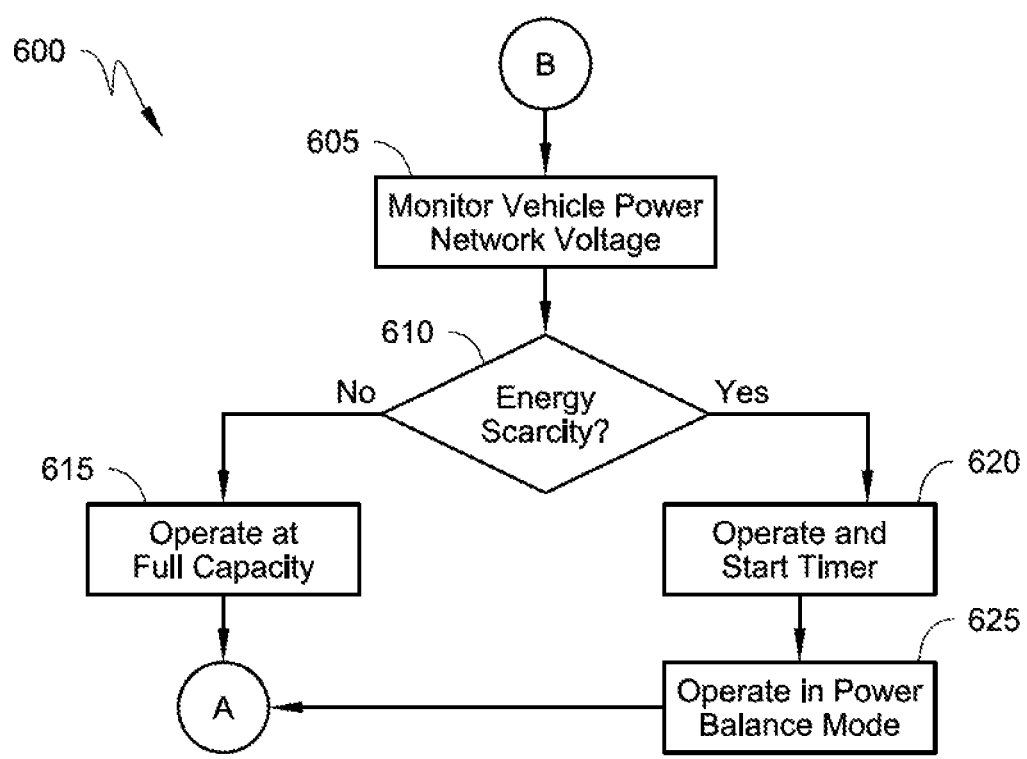
FIG. 6 illustrates a flow chart of a first power and load management method of a transport climate control system using a vehicle electrical system when the optional auxiliary battery system is not present, according to one embodiment.

FIG. 6 illustrates one embodiment of a first power and load management method 600 of a transport climate control system using the vehicle electrical system 200 when the optional auxiliary battery system 230 is not present. The method 600 begins at 605 whereby the controller 260 monitors a vehicle voltage provided by the vehicle power network 204 to the DC regulated bus 202. In some embodiments, a voltage sensor (not shown) is disposed in the vehicle power network 204 to measure the vehicle voltage. The voltage sensor then sends the vehicle voltage measurement to the controller 260. In some embodiments, a current sensor (not shown) can be disposed in the vehicle power network 204 to measure current coming into and out of the vehicle battery 210. In these embodiments, the current measurements can be sent to the controller 260 in lieu of the vehicle voltage measurement. The method 600 then proceeds to 610.

At 610, the controller 260 determines whether there is an energy scarcity of the vehicle power network 204 based on the vehicle voltage measurement obtained at 605. In embodiments where a measured current coming into and out of the vehicle battery 210 is received by the controller 260, the controller 260 can determine whether the vehicle power network 204 requires auxiliary power assistance based on the measured current.

In some embodiments, the controller 260 determines that there is an energy scarcity of the vehicle power network 204 when the vehicle voltage measurement is below an energy scarcity threshold. In these embodiments, a vehicle voltage measurement below the energy scarcity threshold can indicate that in order to power the transport climate control load network 212, the vehicle electrical system 200 is drawing current from both the vehicle alternator 205 and the vehicle battery 210 at a rate could deplete the vehicle battery 210. That is, the vehicle battery 210 is or would potentially be providing more current than it is receiving.

It will be appreciated that there can be multiple reasons for why energy scarcity of the vehicle power network 204 can occur. For example, when the vehicle power network 204 includes the vehicle alternator, the vehicle alternator 205 might not be rated for the capacity needed for loads of the transport climate control load network 212. Another example is that when the vehicle is slowing down (e.g., the vehicle is not running a full speed), the vehicle alternator 205 may not be operating to supply a full capacity (for example, the vehicle alternator can be provided with 70% or 65% of the rated capacity). For example, the vehicle alternator 205 at 100 A can only provide 70 A or 65 A as the vehicle is slowing down. For the vehicle equipped with auto start-stop system (for example, to comply with the EU emission standards), the vehicle can shut down completely when the vehicle comes to a standstill stop (i.e., the vehicle alternator 205 provides no current).

In some embodiments, the energy scarcity threshold can be based on characteristics of the vehicle battery 210. For example, the energy scarcity threshold can be based on a current direction of current between the vehicle power network 204 and the bi-directional voltage converter 240. Thus, when the vehicle power network 204 has excess capacity available for powering the transport climate control load network 212, a positive current from the vehicle power network 204 to the bi-directional voltage converter 204 will indicate that there is no energy scarcity. When a negative current is detected from the vehicle power network 204 to the bi-directional voltage converter 204, an energy scarcity is determined. If the controller 250 determines that there is not an energy scarcity of the vehicle power network 204, the method 600 proceeds to 615. If the controller 250 determines that there is an energy scarcity of the vehicle power network 204, the method 600 proceeds to 620.

At 615, the vehicle electrical system 200 operates at full capacity. In particular, the controller 260 instructs the transport climate control system to operate at full capacity. That is, the controller 260 instructs one or more loads of the transport climate control load network 212 to operate as necessary to bring the internal space temperature to the desired setpoint temperature. In particular, the controller 260 is configured to control the vehicle isolator 215 so as to allow power from the vehicle power network 204 to be supplied to DC regulated bus 202. In some embodiments, the power from the vehicle power network 204 can be from the vehicle alternator 205 without depleting charge of the vehicle battery 210. Accordingly, the vehicle electrical system 200 can provide power to the transport climate control load network 212 to operate the transport climate control system as desired. In some embodiments, the controller 260 can instruct the CDM 250 and the compressor 255 to operate at full capacity. In some embodiments, the controller 260 can instruct the one or more evaporator blowers 265, the one or more condenser fans 270 and/or the heater 275 to operate at full capacity.

Also, the controller 260 is configured to control the vehicle isolator 215 so as to allow power from the vehicle power network 204 to be supplied to DC regulated bus 202. In some embodiments, the power from the vehicle power network 204 is from the vehicle alternator 205 without depleting charge of the vehicle battery 210. Accordingly, the vehicle electrical system 200 can provide power to the transport climate control load network 212 to operate the transport climate control system as desired. The method 600 then returns to the method 500 for operating a transport climate control system at A.

At 620, the vehicle electrical system 200 continues to power the transport climate control load network 212 as previously instructed and starts a timer. The timer can be based on typical traffic factors. In some embodiments, the controller 260 can also send an alert, for example, to the user (e.g., vehicle driver), the cargo customer, etc. that there is an energy scarcity of the vehicle electrical system 200. The alert can be sent via a SMS message, an email, can be displayed to the vehicle driver via the remote controller 280, etc. When the timer expires, the method 600 proceeds to 625.

In some embodiments, the alert can instruct the driver to start the vehicle and run at a fast idle (e.g., raise an idle speed of a prime mover of the vehicle without raising a speed at which the vehicle is moving) or downshift a vehicle prime mover to operate at a higher prime mover RPM so as to prevent a failure of the transport climate control system and to prevent shedding or derating of loads of the transport climate control load network 212. In some embodiments, the controller 260 can instruct the vehicle to start an automatic restart module to start the vehicle and run at a fast idle to prevent failure of the transport climate control system and to prevent shedding or derating of loads of the transport climate control load network 212. In some embodiments, the controller 260 can instruct the vehicle to disable an auto start/stop system of the vehicle prime mover. In some embodiments, the alert can be sent a time period (e.g., 1 to 5 minutes) before any action is taken or required.

At 625, the controller 260 controls the vehicle electrical system 200 to operate in a power balance mode. In particular, the controller 260 manages both the amount of power provided by the vehicle power network 204 and the amount of power drawn by the transport climate control load network 212 to ensure that the amount of power drawn by the transport climate control load network 212 does not exceed the amount of power available from the vehicle power network 204. The power balance mode is discussed in more detail with respect to FIG. 9. The method 600 then returns to A.

Figure 7:
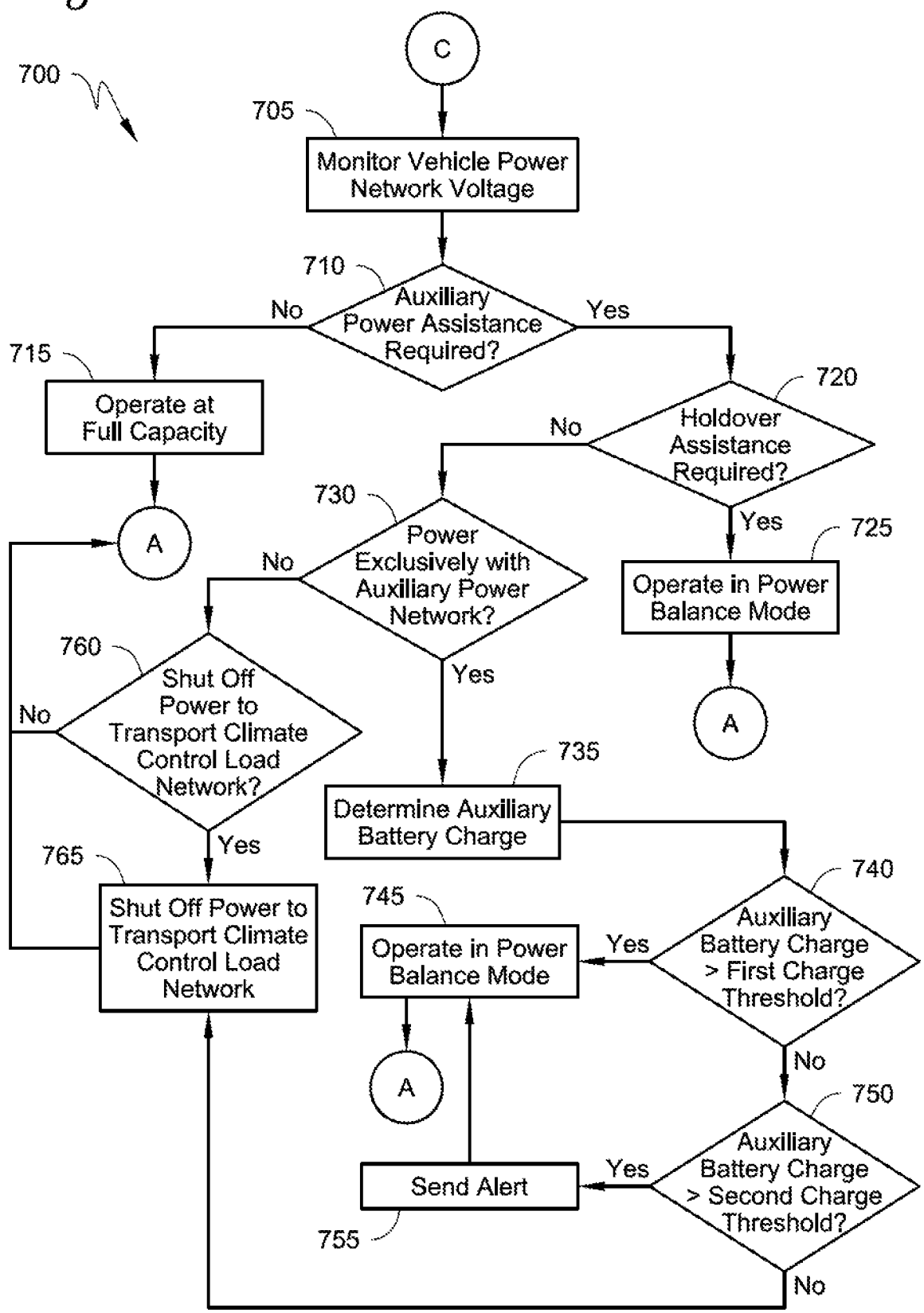
FIG. 7 illustrates a flowchart of a second power and load management method of a transport climate control system using a vehicle electrical system when the optional auxiliary battery system is present, according to one embodiment.

FIG. 7 illustrates one embodiment of a second power and load management method 700 of a transport climate control system using the vehicle electrical system 200 when the optional auxiliary battery system 230 is present. The method 700 begins at 705 whereby the controller 260 monitors a vehicle voltage provided by the vehicle power network 204 to the DC regulated bus 202. In some embodiments, a voltage sensor (not shown) is disposed in the vehicle power network 204 to measure the vehicle voltage. The voltage sensor then sends the vehicle voltage measurement to the controller 260. In some embodiments, a current sensor (not shown) can be disposed in the vehicle power network 204 to measure current coming into and out of the vehicle battery 210. In these embodiments, the current measurements can be sent to the controller 260 in lieu of the vehicle voltage measurement. The method 700 then proceeds to 710.

At 710, the controller 260 determines whether the vehicle power network 204 requires auxiliary power assistance based on the vehicle voltage provided by the vehicle power network 204 to the DC regulated bus 202. In embodiments where a measured current coming into and out of the vehicle battery 210 is received by the controller 260, the controller 260 can determine whether the vehicle power network 204 requires auxiliary power assistance based on the measured current.

The vehicle electrical system 200 may not require auxiliary power assistance when, for example, the vehicle is highway cruising with limited stops or idling. Accordingly, the vehicle alternator 205 is supplying sufficient power to power the transport climate control load network 212 by itself and can potentially supply power to the bi-directional voltage converter 240 to charge one or more auxiliary batteries of the auxiliary battery system 230. Also, the vehicle electrical system 200 may not require auxiliary power assistance when, for example, the vehicle is city driving with stops and idling that can reduce the amount of power available by the vehicle alternator 205. Accordingly, the vehicle alternator 205, with potentially the assistance of the vehicle battery 210, can supply sufficient power to power the transport climate control load network 212 but potentially not enough to also supply power to the bi-directional voltage converter 240 to charge one or more auxiliary batteries of the auxiliary battery system 230.

In some embodiments, when the vehicle power network 204 does not require auxiliary power assistance, the vehicle alternator 205 can supply power to the DC regulated bus 202 without assistance of the vehicle battery 210. In some embodiments, the controller 260 can determine that the vehicle power network 204 does not require auxiliary power assistance when the vehicle voltage is greater than an auxiliary power threshold. For example, when the DC regulated bus 202 is a 12 volt regulated bus, the controller 260 can determine that the vehicle power network 204 does not require auxiliary power assistance when the vehicle voltage provided by the vehicle power network 204 is greater than the auxiliary power threshold that is, for example, about 13 volts. In another example, when the DC regulated bus 202 is a 12 volt regulated bus, the controller 260 can determine that the vehicle power network 204 does not require auxiliary power assistance when the vehicle current provided by the vehicle power network 204 is going in a positive direction towards the bi-directional voltage converter 240.

If the controller 260 determines that the vehicle power network 204 does not require auxiliary power assistance, the method 700 proceeds to 715. If the controller 260 determines that the vehicle power network 204 does requires auxiliary power assistance, the method 700 proceeds to 720.

At 715, the controller 260 instructs the transport climate control system to operate at full capacity. That is, the controller 260 instructs one or more loads of the transport climate control load network 212 to operate as necessary to bring the internal space temperature to the desired setpoint temperature. In particular, the controller 260 is configured to control the vehicle isolator 215 so as to allow power from the vehicle power network 204 to be supplied to DC regulated bus 202. In some embodiments, the power from the vehicle power network 204 can be from the vehicle alternator 205 without depleting charge of the vehicle battery 210. The controller 260 is also configured to control the auxiliary power on/off switches 235 so as to prevent the auxiliary battery system 230 from supplying power to the DC regulated bus 202. Accordingly, the vehicle electrical system 200 can provide power to the transport climate control load network 212 to operate the transport climate control system as desired. In some embodiments, the controller 260 can instruct the CDM 250 and the compressor 255 to operate at full capacity. In some embodiments, the controller 260 can instruct the one or more evaporator blowers 265, the one or more condenser fans 270 and/or the heater 275 to operate at full capacity. The method 700 then returns to A.

In some embodiments, the controller 260 can also determine whether one or more of the auxiliary batteries of the auxiliary battery system 230 require charging. If charging is required, the controller 260 can be configured to operate the bi-directional voltage converter 240 in the charge mode so as to charge the one or more auxiliary batteries of the auxiliary battery system 230. If charging is not required, the controller 260 can be configured to operate the bi-voltage directional converter 240 in the null mode. Thus, the DC regulated bus 202 supplies required power to the transport climate control load network 212 to operate the transport climate control system as desired and can supply any excess power available to the bi-directional voltage converter 240 to charge the auxiliary battery system 206.

In some embodiments, in order to prevent significant discharge of the vehicle battery 210, the controller 260 can be configured to operate the bi-directional voltage converter 240 in the null mode and prevent charging of the auxiliary battery system 230.

The method 700 then proceeds back to A.

At 720, the controller 260 determines whether the vehicle power network 204 requires holdover assistance based on the vehicle voltage provided by the vehicle power network 204 to the DC regulated bus 202. The vehicle power network 204 can require holdover assistance when, for example, the vehicle alternator 205, with potentially the assistance of the vehicle battery 210, is not supplying sufficient power to power the transport climate control load network 212. In some embodiments, when the vehicle power network 204 requires holdover assistance, the vehicle alternator 205 supplies power to the DC regulated bus 202 with potentially the assistance of the vehicle battery 210, thereby depleting charge of the vehicle battery 210. In some embodiments, the controller 260 can determine whether the vehicle power network requires holdover assistance when the vehicle voltage is within a holdover assistance threshold range. For example, when the DC regulated bus 202 is a 12 volt regulated bus, the controller 260 can determine that the vehicle power network 204 requires holdover assistance when the vehicle voltage provided by the vehicle power network 204 is within the holdover assistance threshold range that is, for example, between about 12 volts and 13 volts.

If the controller 260 determines that the vehicle power network 204 requires holdover assistance, the method 700 proceeds to 725. If the controller 260 determines that the vehicle power network 204 does not require holdover assistance, the method 700 proceeds to 730.

At 725, the controller 260 controls the vehicle electrical system 200 to operate in a power balance mode. In particular, the controller 260 manages the amount of power provided by the vehicle power network 204 and the auxiliary battery system 230 and the amount of power drawn by the transport climate control load network 212 to ensure that the amount of power drawn by the transport climate control load network 212 does not exceed the amount of power available from the vehicle power network 204 and the auxiliary battery system 230. The power balance mode is discussed in more detail with respect to FIG. 9. The method 700 then returns to A.

At 730, the controller 260 determines whether the vehicle electrical system 200 should be exclusively powered by the auxiliary battery system 230. In some embodiments, the controller determines whether the vehicle electrical system 200 should be exclusively powered by the auxiliary battery system 230 based on the vehicle voltage provided by the vehicle power network 204 to the DC regulated bus 202. The vehicle power network 204 can exclusively use power from the auxiliary battery system 230 to power the DC regulated bus 202 when, for example, the vehicle is not running. Accordingly, use of the vehicle power network 204 would significantly discharge the vehicle battery 210. In some embodiments, when the vehicle electrical system 200 is exclusively powered by the auxiliary battery system 230, one or more of the auxiliary batteries of the auxiliary battery system 230 supplies power to the DC regulated bus 202 and the vehicle power network 204 is prevented from supplying power to the DC regulated bus 202.

Also, in some embodiments, the controller 260 can determine that the vehicle electrical system 200 should be exclusively powered by the auxiliary battery system 230 when the vehicle voltage is within an exclusive power threshold range. For example, when the DC regulated bus 202 is a 12 volt regulated bus, the controller 260 can determine that the vehicle electrical system 200 should be exclusively powered by the auxiliary battery system 230 when the vehicle voltage provided by the vehicle power network 204 is within the exclusive power threshold range that is, for example, between about 11.5 volts and 12 volts.

Further, in some embodiments, the controller 260 can determine that the vehicle electrical system 200 should be exclusively powered by the auxiliary battery system 230 based on the amount of current required by the transport climate control load network 212. The bi-directional voltage converter 240 may be limited to the amount of current supplied from the vehicle power network 204 in combination with the energy supplied from the auxiliary power network 206. That is, in some embodiments, the bi-directional voltage converter 240 may only be able to handle supplying a limited amount of current from the auxiliary battery system 230 and the vehicle power network 204 to the DC regulated bus 202. In these embodiments, when the controller 260 determines that the amount of current required by the transport climate control load network 212 exceeds the amount of current that can be supplied by the bi-directional voltage converter 240, the controller 260 can control the vehicle isolator 215 so as to prevent power from the vehicle power network 204 to be supplied to the DC regulated bus 202 and control the auxiliary power on/off switches 235 so as to allow current from the auxiliary battery system 230 to bypass the bi-directional voltage converter 240 and be supplied to the to the DC regulated bus 202.

If the controller 260 determines that the vehicle electrical system 200 should be exclusively powered by the auxiliary battery system 230, the method 700 proceeds to 735. If the controller 260 determines that the vehicle electrical system 200 should not be exclusively powered by the auxiliary battery system 230, the method 700 proceeds to 760.

At 735, the controller 260 determines an auxiliary battery charge percentage of the auxiliary battery system 230. In some embodiments, the bi-directional voltage converter 240 can monitor the auxiliary battery charge percentage of the auxiliary battery system 230 and send the auxiliary battery charge percentage to the controller 260. The method 700 then proceeds to 740.

At 740, the controller 260 determines whether the auxiliary battery charge percentage is greater than a first charge threshold. In some embodiments, the first charge threshold can be a percentage level that the auxiliary battery system 230 can exclusively power the transport climate control load network 212 for a first set period of time without assistance from the vehicle power network 204 or the utility power network 208. In some embodiments, the first charge threshold can be about 50%. If the auxiliary battery charge percentage is greater than the first charge threshold, the method 700 proceeds to 745. If the auxiliary battery charge percentage is not greater than the first charge threshold, the method 700 proceeds to 750.

At 745, the controller 260 controls the vehicle electrical system 200 to operate in a power balance mode. In particular, the controller 260 manages both the amount of power provided by the auxiliary battery system 230 and the amount of power drawn by the transport climate control load network 212 to ensure that the amount of power drawn by the transport climate control load network 212 does not exceed the amount of power available from the auxiliary battery system 230. The power balance mode is discussed in more detail with respect to FIG. 9. The method 700 then returns to A.

At 750, the controller 260 determines whether the auxiliary battery charge percentage is greater than a second charge threshold. In some embodiments, the second charge threshold can be a percentage level that the auxiliary battery system 230 should no longer power the transport climate control load network 212 without assistance from the vehicle power network 204 or the utility power network 208. In some embodiments, the second charge threshold can be about 20%. If the auxiliary battery charge percentage is greater than the second charge threshold, the method 700 proceeds to 755. If the auxiliary battery charge percentage is not greater than the second charge threshold, the method 700 proceeds to 760.

At 755, the controller 260 sends an alert, for example, to the user (e.g., vehicle driver), the cargo customer, etc. that there is limited power available to the vehicle electrical system 200 to power the loads of the transport climate control load network 212. The alert can be sent via a SMS message, an email, can be displayed to the vehicle driver via the remote controller 280, etc.

In some embodiments, the alert can instruct the driver to start the vehicle and run at a fast idle (e.g., raise an idle speed of a prime mover of the vehicle without raising a speed at which the vehicle is moving) or downshift a vehicle prime mover to operate at a higher prime mover RPM so as to prevent a failure of the transport climate control system and to prevent shedding or derating of loads of the transport climate control load network 212. In some embodiments, the controller 260 can instruct the vehicle to start an automatic restart module to start the vehicle and run at a fast idle to prevent failure of the transport climate control system and to prevent shedding or derating of loads of the transport climate control load network 212. In some embodiments, the controller 260 can instruct the vehicle to disable an auto start/stop system of the vehicle prime mover. In some embodiments, the alert can be sent a time period (e.g., 1 to 5 minutes) before any action is taken or required.

At 760, the controller 260 determines whether the vehicle electrical system 200 should shut off power to the transport climate control load network 212 based on the vehicle voltage provided by vehicle power network 204. That is, the controller 260 determines whether the DC regulated bus 202 should be prevented from receiving energy from the vehicle power network 204, the auxiliary power network 206 and, when applicable, the utility power network 208 and sending said energy to the components of the transport climate control load network 212. The vehicle electrical system 200 should shut off power to the transport climate control load network 212 when, for example, there is insufficient power available to power the transport climate control load network 212 or could harm operation of the vehicle. In some embodiments, the controller 260 can determine that the vehicle electrical system 200 should shut off power to the transport climate control load network 212 when the vehicle voltage is less than a shut off threshold. For example, when the DC regulated bus 202 is a 12 volt regulated bus, the controller 260 can determine that the vehicle electrical system 200 should shut off power to the transport climate control load network 212 when the vehicle voltage provided by the vehicle power network 204 is less than the shut off threshold that is, for example, about 11.5 volts. If the controller 260 determines that the vehicle electrical system 200 should shut off power to the transport climate control load network 212, the method 700 proceeds to 765. If the controller 260 determines that the vehicle electrical system 200 does not have to shut off power to the transport climate control load network 212, the method 700 proceeds back to A.

At 765, the controller 260 shuts off power from the vehicle electrical system 200 to the transport climate control load network 212. In some embodiments, the controller 260 can be configured to control the vehicle isolator 215 so as to prevent power from the vehicle power network 204 to be supplied to the DC regulated bus 202. Also, the controller 260 can be configured to control the auxiliary power on/off switches 235 so as to prevent power from the auxiliary battery system 230 to be supplied to the to the DC regulated bus 202. In some embodiments, the controller 260 can also be configured to control the AC-DC converter 225 so as to prevent power from the utility power 220.

In some embodiments, the controller 260 can also send an alert, for example, to the user (e.g., vehicle driver), the cargo customer, etc. The alert can be sent via a SMS message, an email, can be displayed to the vehicle driver via the remote controller 280, etc. The method 600 then proceeds back to A.

In some embodiments, the alert can instruct the driver to start the vehicle and run at a fast idle (e.g., raise an idle speed of a prime mover of the vehicle without raising a speed at which the vehicle is moving) or downshift a vehicle prime mover to operate at a higher prime mover RPM so as to prevent a failure of the transport climate control system and to prevent shedding or derating of loads of the transport climate control load network 212. In some embodiments, the controller 260 can instruct the vehicle to start an automatic restart module to start the vehicle and run at a fast idle to prevent failure of the transport climate control system and to prevent shedding or derating of loads of the transport climate control load network 212. In some embodiments, the controller 260 can instruct the vehicle to disable an auto start/stop system of the vehicle prime mover. In some embodiments, the alert can be sent a time period (e.g., 1 to 5 minutes) before any action is taken or required.

Figure 8:
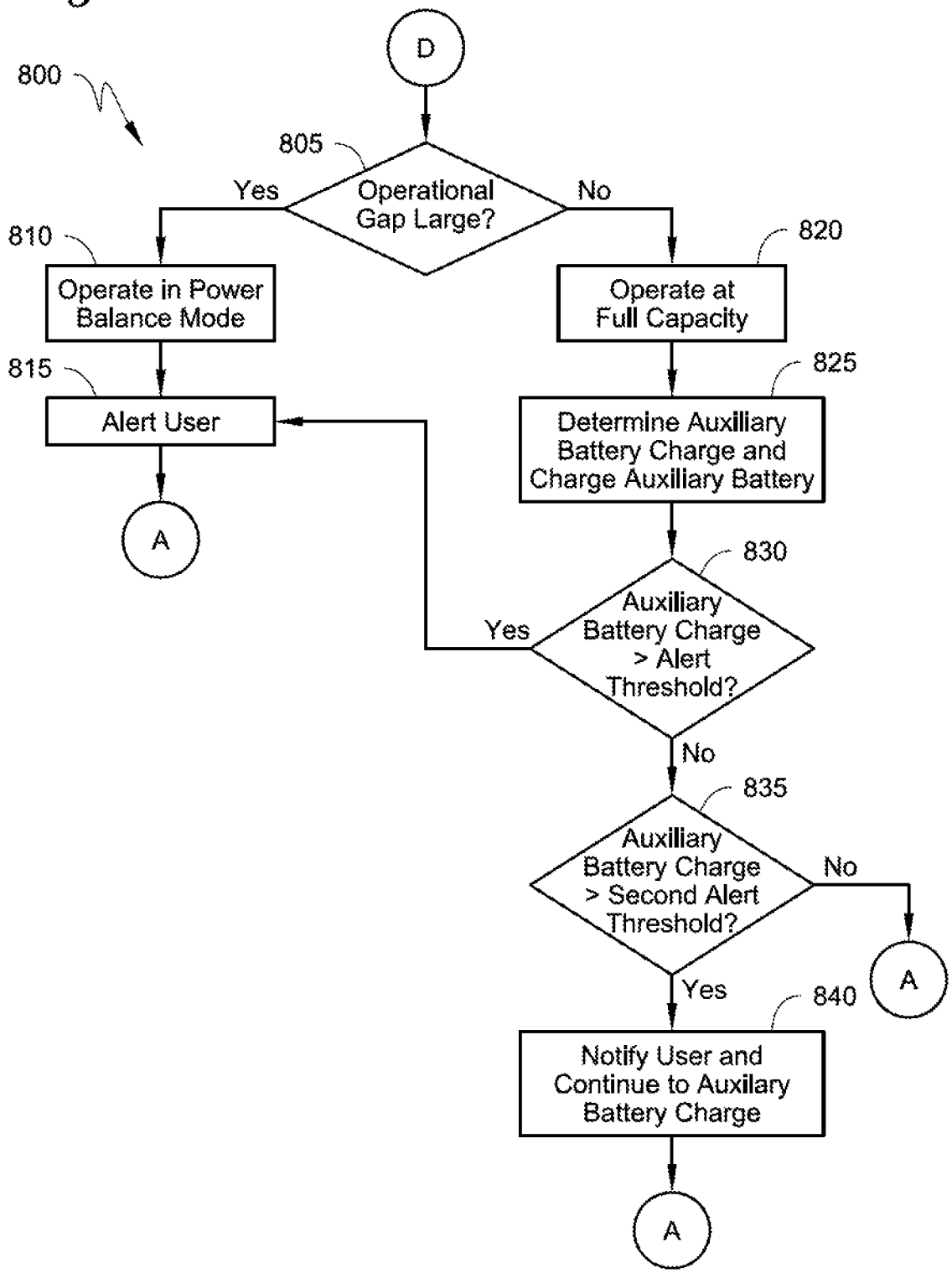
FIG. 8 illustrates a flowchart of a third power and load management method of a transport climate control system using a vehicle electrical system when the optional utility power is present.

FIG. 8 illustrates one embodiment of a third power and load management method 800 of a transport climate control system using the vehicle electrical system 200 when the optional utility power 220 is present. The method 800 begins at 805 whereby the controller 260 determines whether the operational gap between the monitored internal space temperature and the desired setpoint temperature of the internal space is large. Whether the operational gap is large or small can be based on a gap threshold. The gap threshold can be cargo specific and stored, for example, in a look up table or determined, for example, based on one or more equations in the controller 260. Thus, the gap threshold can be based on the type of cargo being stored in the transport unit. That is, the climate requirements for different cargo can determine the gap threshold used by the controller 260. For example, the gap threshold can be higher (i.e., the operational gap has more margin) for a frozen cargo that is stored in the transport unit than for a pharmaceutical cargo stored in the transport unit that may have a smaller operational gap margin. When the controller 260 determines that the operational gap is large, the method 800 proceeds to 810. When the controller 260 determines that the operational gap is not large, the method 800 proceeds to 820.

At 810, the controller 260 controls the vehicle electrical system 200 to operate in a power balance mode. In particular, the controller 260 manages the amount of power provided by the utility power 220 and the amount of power drawn by the transport climate control load network 212 to ensure that the amount of power drawn by the transport climate control load network 212 does not exceed the amount of power available from the utility power 220. The power balance mode is discussed in more detail with respect to FIG. 9. The method 800 then returns to 815.

At 815, the controller 260 sends an alert, for example, to the user (e.g., vehicle driver), the cargo customer, etc. that the vehicle electrical system 200 is connected to the utility power 220. The alert can be sent via a SMS message, an email, can be displayed to the vehicle driver via the remote controller 280, etc. The alert can notify the user not to move the vehicle and/or disconnect the utility power 220 from the vehicle electrical system 200 so that the transport climate control system can condition the internal space of the transport unit. The method 800 then returns to A.

At 820, the controller 260 instructs the transport climate control system to operate at full capacity. That is, the controller 560 instructs one or more loads of the transport climate control load network 212 to operate as necessary to bring the internal space temperature to the desired setpoint temperature. In particular, the controller 260 is configured to control the vehicle isolator 215 so as to allow power from the vehicle power network 204 to be supplied to DC regulated bus 202. In some embodiments, the power from the vehicle power network 204 can be from the vehicle alternator 205 without depleting charge of the vehicle battery 210. Accordingly, the vehicle electrical system 200 can provide power to the transport climate control load network 212 to operate the transport climate control system as desired. In some embodiments, the controller 260 can instruct the CDM 250 and the compressor 255 to operate at full capacity. In some embodiments, the controller 260 can instruct the one or more evaporator blowers 265, the one or more condenser fans 270 and/or the heater 275 to operate at full capacity. The method 800 then returns to 825.

At 825, the controller 260 instructs charging of the auxiliary battery system 230 and determines an auxiliary battery charge percentage of the auxiliary battery system 230. In some embodiments, the controller 260 directs current from the utility power network 208 to the bi-directional voltage converter 240 in order to charge the auxiliary battery system 230. Thus, the utility power 220 can concurrently supply power to the transport climate control load network 212 to power the transport climate control system and to the auxiliary power network 206 to charge the auxiliary battery system 230.

In some embodiments, the bi-directional voltage converter 240 also monitors the auxiliary battery charge percentage of the auxiliary battery system 230 and sends the auxiliary battery charge percentage to the controller 260. The method 800 then proceeds to 830.

At 830, the controller 260 determines whether the auxiliary battery charge percentage obtained at 825 is less than an alert threshold. In some embodiments, the alert threshold can be, for example, a 50% auxiliary battery charge percentage. If the auxiliary battery charge percentage is less than the alert threshold, the method 800 proceeds to 815. Accordingly, disconnection between the utility power 220 and the DC regulated bus 202 can be prevented. If the auxiliary battery charge percentage is not less than the alert threshold, the method 800 proceeds to 835.

At 835, the controller 260 determines whether the auxiliary battery charge percentage obtained at 825 is greater than a second alert threshold. In some embodiments, the second alert threshold can be, for example, an 80% auxiliary battery charge percentage. If the auxiliary battery charge percentage is greater than the second alert threshold, the method 800 proceeds to 840. If the auxiliary battery charge percentage is not greater than the alert threshold, the method 800 proceeds to A.

Figure 9:
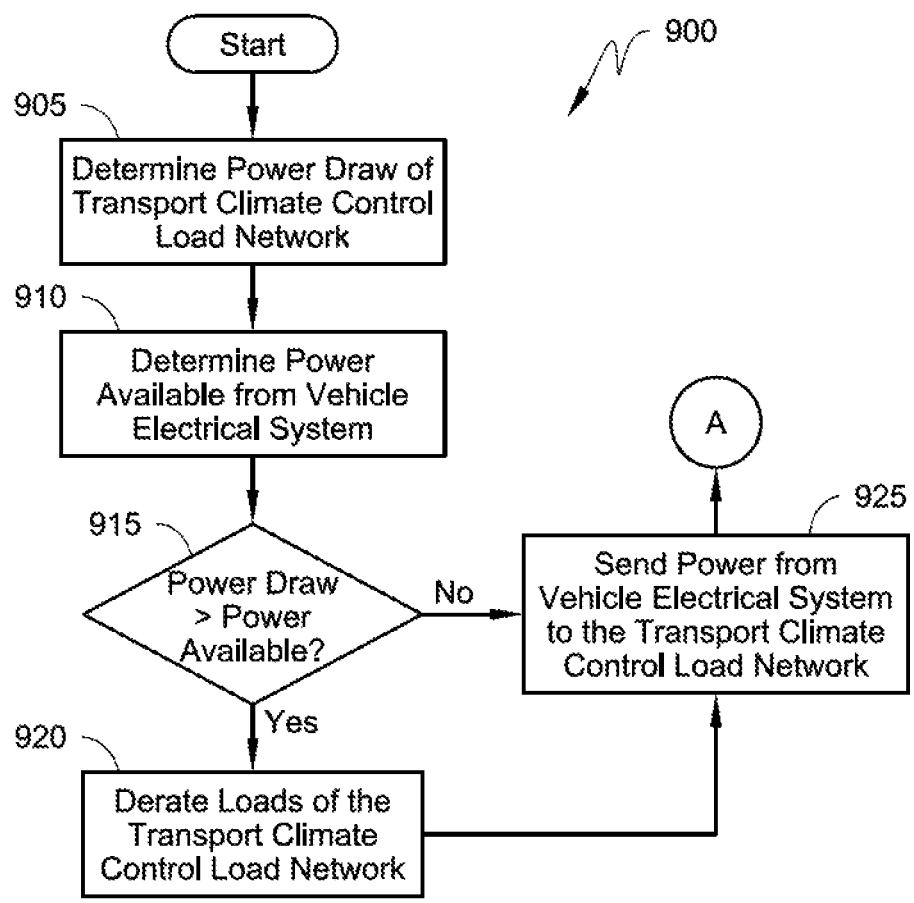
FIG. 9 illustrates a flowchart of a method for operating a vehicle electrical system in a power balance mode, according to one embodiment.

At 840, the controller 260 sends a notification, for example, to the user (e.g., vehicle driver), the cargo customer, etc. that the vehicle electrical system 200 can be safely disconnected to the utility power 220. The notification can be sent via a SMS message, an email, can be displayed to the vehicle driver via the remote controller 280, etc. The notification can notify the user that the auxiliary battery system 230 has an adequate state of charge to power the transport climate control load network 212 if the utility power 220 is disconnected from the vehicle electrical system 200. Thus, the user can be assured that the cargo being stored in the transport unit is safe. The method 800 then returns to A FIG. 9 illustrates a flowchart of a method 900 for operating the vehicle electrical system 200 in a power balance mode. The method begins at 905, whereby the controller 260 determines a power draw of the transport climate control load network 212. In some embodiments, the controller 260 can store in memory a power rating (i.e., the amount of current, voltage and/or power used by a component when operating) for each component of the transport climate control load network 212 during different operation modes. The controller 260 can monitor the transport climate control load network 212 to determine which components of the transport climate control load network 212 are operating. The controller 260 can access the power rating of those components of the transport climate control load network 212 that are operating and calculate the power draw of the transport climate control load network 212. In some embodiments, the power rating can be based on simulation data or lab testing.

In other embodiments, a current sensor can be disposed in the vehicle power network 204 to measure current being sourced by the vehicle electrical system 200 to the load transport climate control load network 212. In these embodiments, the current measurements can be sent to the controller 260. Based on the current measurement, the controller 260 can determine the power draw of the power transport climate control load network 212.

In yet some other embodiments, the controller 260 can determine a power draw of the transport climate control load network 212 based on an operational gap of the transport climate control system. For example, a temperature sensor can monitor an internal space temperature of an internal space (e.g., the load space 12 shown in FIG. 1A) of a transport unit that is conditioned using the transport climate control system. The controller 260 then compares the monitored internal space temperature with a desired setpoint temperature of the internal space to obtain an operational gap between the monitored internal space temperature and the desired setpoint temperature. In some embodiments, the operational gap is an absolute difference between the internal space temperature and the desired setpoint temperature of the internal space. Based on the operational gap and the type of cargo stored in the transport unit, the controller 260 can determine the power draw of the transport climate control load network 212.

In some embodiments, the controller 260 can use a lookup table or a set of equations to determine the power draw based on the type of cargo stored in the transport unit. In some embodiments, the controller 260 can make use of operational status data of the transport climate control system (e.g, which loads of the transport climate control load network 212 are used when performing specific operation modes of the transport climate control system, etc.) to determine the power draw. Also, in some embodiments, the controller 260 can make use of other data (e.g., weather data, driving data, etc.) to determine the power draw.

It will be appreciated that the urgency in closing the operational gap can vary based on the type of cargo stored in the transport unit. For example, there may be a higher urgency in keeping the operational gap small when the cargo is a pharmaceutical cargo than when the cargo is a frozen cargo. This is further discussed above with respect to FIG. 5. The method 900 then proceeds to 910.

At 910, the controller 260 determines the amount of power available from the vehicle electrical system 200. In some embodiments, such as at 525 in FIG. 5 and at 625 in FIG. 6, the controller 260 determines the amount of power available from the vehicle power network 204 as the auxiliary battery system 230 is not being used to supply power to the DC regulated bus 202.

In one implementation, the controller 260 can determine the amount of power available from the vehicle power network 204 using the bi-directional voltage converter 240. In particular, the bi-directional voltage converter 240 can monitor the amount of current supplied onto the DC regulated bus 202 and send the current amount to the controller 260. The controller 260 can then determine the power available from the vehicle power network 204 by taking a difference between the current supplied by the bi-directional voltage converter 240 and a current draw of the transport climate control network 212 obtained based on the power draw of the transport climate control load network 212 determined at 905.

In another implementation, the controller 260 can determine the amount of power available from the vehicle power network 204 based on the vehicle voltage provided by the vehicle power network 204 to the DC regulated bus 202 when the vehicle power network includes the vehicle alternator 205. When one or more loads of the transport climate control network 212 are requiring more power than what is available by, for example, the alternator 205 of the vehicle power network 204, the vehicle voltage has been found to droop from an expected vehicle voltage value. The amount of power available from the vehicle power network 204 can be determined based on the droop in the vehicle voltage. In some embodiments, a voltage sensor is disposed in the vehicle power network 204 to measure the vehicle voltage. The voltage sensor then sends the vehicle voltage measurement to the controller 260.

In some embodiments, such as at 725 in FIG. 7, the controller 260 determines the amount of power available from the vehicle power network 204 and the auxiliary battery system 230 being used to supply power to the DC regulated bus 202. As discussed above, the controller 260 can determine the amount of power available from the vehicle power network 204 using the bi-directional voltage converter 240 and/or the vehicle voltage provided by the vehicle power network 204 to the DC regulated bus 202. The controller 260 can determine the amount of power available from the auxiliary battery system 230 using the bi-directional voltage converter 240. In particular, the bi-directional voltage converter 240 can determine a charge level of the auxiliary battery system 230 and determine the amount of power available based on the charge level.

In some embodiments, the bi-directional voltage converter 240 may be limited to the amount of current that can be supplied from the vehicle power network 204 in combination with the energy supplied from the auxiliary power network 206. That is, in some embodiments, the bi-directional voltage converter 240 may only be able to handle supplying a limited amount of current from the auxiliary battery system 230 and the vehicle power network 204 to the DC regulated bus 202. In these embodiments, when the controller 260 determines the amount of power available from the vehicle power network 204 and the auxiliary battery system 230 exceeds what the bi-directional voltage converter 240 can handle, the controller 260 can determine that the power available from the vehicle electrical system 200 is limited to the amount of current available by the auxiliary battery system 230.

In some embodiments, such as at 745 in FIG. 7, the controller 260 determines the amount of power available from the auxiliary battery system 230 being used to supply power to the DC regulated bus 202. As discussed above, the controller 260 can determine the amount of power available from the bi-directional voltage converter 240 based on the charge level of the auxiliary battery system 230.

In some embodiments, such as at 810 in FIG. 8, the controller 260 determines the amount of power available from the utility power network 208 being used to supply power to the DC regulated bus 202. For example, in some embodiments, the controller 260 can determine the amount of power available from the utility power network 208 using the bi-directional voltage converter 240. In particular, the bi-directional voltage converter 240 can monitor the amount of current supplied from the utility power 220 to the bi-directional voltage converter 240 via the DC regulated bus 202 and send the current amount to the controller 260. The controller 260 can then determine the power available from the utility power network 208 by taking a difference between the current supplied by the bi-directional voltage converter 240 and a current draw of the transport climate control network 212 obtained based on the power draw of the transport climate control load network 212 determined at 905. In some embodiments, the controller 260 can determine the amount of power available from the utility power network 208 based on a voltage of the DC regulated bus 202 between the utility power network 208 and the bi-directional voltage converter 240.

It will be appreciated that in some embodiments 905 and 910 can be performed concurrently. Also, in some embodiments, 905 can be performed after 910. The method 900 then proceeds to 915.

At 915, the controller 260 is configured to determine whether the amount of power draw of the transport climate control load network 212 exceeds the amount of power available from the vehicle electrical system 200. If the amount of power draw of the transport climate control load network 212 exceeds the amount of power available from the vehicle electrical system 200, the method 900 proceeds to 920. If the amount of power draw of the transport climate control load network 212 does not exceed the amount of power available from the vehicle electrical system 200, the method 900 proceeds to 925.

At 920, the controller 260 is configured to shed one or more loads of the transport climate control load network 212 in order to reduce the power draw of the transport climate control load network 212. That is, the controller 260 can perform a load shedding process of the transport climate control load network 212 to reduce the amount of energy required by the DC regulated bus 202 and thereby the vehicle power network 204 and/or the auxiliary power network 206 based on the amount of energy supplied by the vehicle power network 204 and/or the amount of energy stored in the auxiliary battery system 230. It will be appreciated that in embodiments where the vehicle power network 204 includes the vehicle alternator 205, as the controller 260 sheds or derates one or more loads of the transport climate control load network 212, the vehicle voltage of the vehicle power network 204 may rise due to the decreased power demand on the vehicle alternator 205.

In some embodiments, the controller 260 can instruct the CDM 250 and the compressor 255 to reduce speed in order to reduce the amount of power drawn by the transport climate control load network 212. The amount of speed reduction by the CDM 250 and the compressor 255 can be determined by the controller 260 in order to match or fall below the amount of power available from the vehicle electrical system 200. In some embodiments, the controller 260 can also instruct the one or more evaporator blowers 265, the one or more condenser fans 270 and/or the heater 275 to reduce or stop operation to reduce the amount of power drawn by the transport climate control load network 212. The controller 260 is configured to reduce or stop operation of one or more of the loads of the transport climate control load network 212 in order to match or fall below the amount of power available from the vehicle electrical system 200. The method 920 then proceeds to 925.

At 925, the controller 260 is configured to operate the vehicle electrical system 200 to power the transport climate control load network 212 using one or more of the vehicle power network 204 and the auxiliary battery system 230.

In some embodiments, such as at 420 in FIG. 4 and at 525 in FIG. 5, the controller 260 is configured to control the vehicle isolator 215 so as to allow the power available from the vehicle power network 204 to be supplied to DC regulated bus 202. In some embodiments, the power available from the vehicle power network 204 can be from the vehicle alternator 205 and/or the vehicle battery 210. The vehicle power network 204 (and thus the vehicle electrical system 200) can provide the power available to the transport climate control load network 212 to operate the transport climate control system to match the power draw of the transport climate control load network 212.

In some embodiments, such as at 625 in FIG. 6, the controller 260 is configured to control the vehicle isolator 215 so as to allow power from the vehicle power network 204 to be supplied to the DC regulated bus 202. Also, the controller 260 is configured to control the auxiliary power on/off switches 235 so as to allow power from the auxiliary battery system 230 to be supplied to the to the DC regulated bus 202. The auxiliary battery system 230 can supplement the power provided by the vehicle power network 204 so that the vehicle electrical system 200 can provide the power available to the transport climate control load network 212 to operate the transport climate control system to match the power draw of the transport climate control load network 212.

In embodiments, where the bi-directional voltage converter 240 is limited in the amount of current it can supply, the controller 260 can control the vehicle isolator 215 so as to prevent power from the vehicle power network 204 to be supplied to the DC regulated bus 202 and control the auxiliary power on/off switches 235 so as to allow current from the auxiliary battery system 230 to bypass the bi-directional voltage converter 240 and be supplied to the to the DC regulated bus 202.

In some embodiments, such as at 645 in FIG. 6, the controller 260 is configured to control the auxiliary power on/off switches 235 so as to allow the power available from the auxiliary battery system 230 to be supplied to the to the DC regulated bus 202. The controller 260 is also configured to control the vehicle isolator 215 so as to prevent power from the vehicle power network 204 to be supplied to the DC regulated bus 202. The auxiliary battery system 230 (and thus the vehicle electrical system 200) can provide the power available to the transport climate control load network 212 to operate the transport climate control system to match the power draw of the transport climate control load network 212.

The method then proceeds back to A and the method 400 shown in FIG. 4.

The embodiments described herein can address three different but related issues. The first issue is related to variable loads. The vehicle alternator 205 has nominal power capacity. In addition to the transport climate control system, the electrical system of the vehicle has other loads such as the lights of the vehicle, etc. Assuming that the power capacity of the vehicle alternator 205 is constant, as all the other loads (such as lights, fan, CD player, etc.) are switching on or off, the available power capacity for the transport climate control system is therefore not constant but variable. The second issue is related to the speed of the prime mover of the vehicle. Assuming the vehicle has a prime mover (e.g., a combustion engine such as a diesel engine, etc.), and the power capacity of the vehicle alternator 205 is driven or determined by the speed of the prime mover. If the vehicle is stopped at a traffic light and the prime mover is idling, the power capacity that the vehicle (for example from the vehicle alternator 205) can provide drops. If the vehicle is running at a cruising speed, then the vehicle alternator 205 can generate required current for powering the transport climate control system). Part of the current provided by the vehicle (for example, the vehicle alternator 205) can be used to power the vehicle's other loads (such as lights, fan, CD player, etc.). The rest of the current can be drawn to the transport climate control system. The third issue is that failure of the vehicle electrical system can be prevented when demand from load components of the transport climate control system exceeds the available power capacity by managing the amount and type of power supplied by vehicle electrical system and managing operation of one or more loads of the transport climate control load network.

The flowcharts shown in FIGS. 4-9 allow for management of power demands from the components of the transport climate control system based on the varying levels of power of the vehicle power network in order to maintain proper operation of the vehicle. These methods can manage power demands from the components of the transport climate control system when an auxiliary power network is available or is not available.

The embodiments described herein can prevent failure of the vehicle power network when demand from load components of the transport climate control system exceeds the available power capacity.

The embodiments described herein can also provide efficient use an auxiliary power network in combination with a vehicle power network.

Aspects:

It is to be appreciated that any of aspects 1-8 can be combined with any of aspects 9-16.

Aspect 1. A method for power and load management of a transport climate control system using a vehicle electrical system that includes a vehicle power network and an auxiliary battery system connected to a transport climate control load network via a voltage direct current (DC) regulated bus, the method comprising:
  a controller determining a power draw of the transport climate control load network;
  the controller determining an amount of power available from the vehicle electrical system;
  the controller determining whether the power draw of the transport climate control load network exceeds the amount of power available from the vehicle electrical system;
  shedding one or more loads of the transport climate control load network to reduce the power draw of the transport climate control load network until the power draw of the transport climate control load network matches the power available from the vehicle electrical system; and
  supplying power from the vehicle electrical system to the transport climate control load network.

Aspect 2. The method of aspect 1, wherein shedding one or more loads of the transport climate control load network includes reducing a speed of a variable speed compressor of the transport climate control load network.

Aspect 3. The method of any one of aspects 1 and 2, wherein shedding one or more loads of the transport climate control load network includes stopping operation of at least one of an evaporator blower, a condenser fan and a heater.

Aspect 4. The method of any one of aspects 1-3, wherein determining the power draw of the transport climate control load network includes:
  determining one or more loads of the transport climate control network that are in operation;
  accessing a power rating of each of the one or more loads that are in operation;
  adding the power rating of each of the one or more loads that are in operation to determine the power draw of the transport load network.

Aspect 5. The method of claim 4, wherein the one or more loads includes a variable speed compressor.

Aspect 6. The method of any one of aspects 1-5, wherein determining the amount of power available from the vehicle electrical system includes:
  monitoring a current amount supplied to the DC regulated bus of the vehicle electrical system; and
  subtracting the power draw of the transport climate control load network from the current amount supplied to the DC regulated bus to determine the amount of power available from the vehicle electrical system.

Aspect 7. The method of any one of aspects 1-6, wherein determining the amount of power available from the vehicle electrical system includes determining a vehicle voltage provided by the vehicle power network to the DC regulated bus of the vehicle electrical system and determining the amount of power available from the vehicle electrical system based on a droop in the vehicle voltage from an expected vehicle voltage value.

Aspect 8. The method of any one of aspects 1-7, wherein supplying power from the vehicle electrical system to the transport climate control load network includes:
  exclusively supplying power from the vehicle power network to the transport climate control load network;
  exclusively supplying power from the auxiliary battery system to the transport climate control load network; and
  the vehicle power network and the auxiliary battery system supplying power to the transport climate control load network.

Aspect 9. A vehicle electrical system for power and load management of a transport climate control system, the vehicle electrical system comprising:
  a voltage direct current (DC) regulated bus;
  a vehicle power network configured to generate power from a vehicle and provide the generated power to the voltage DC regulated bus;
  an auxiliary power network that includes an auxiliary battery system connected to the DC regulated bus, wherein the auxiliary battery system is configured to store power and supply the stored power to the DC regulated bus;
  a transport climate control load network receiving power from the DC regulated bus; and
  a controller configured to determine a power draw of the transport climate control load network, to determine an amount of power available from the vehicle electrical system, and to determine whether the power draw of the transport climate control load network exceeds the amount of power available from the vehicle electrical system;
  wherein the vehicle electrical system is configured to shed one or more loads of the transport climate control load network to reduce the power draw of the transport climate control load network until the power draw of the transport climate control load network matches the power available from the vehicle electrical system, and
  wherein the vehicle electrical system is configured to supplying power from the vehicle electrical system to the transport climate control load network with the reduced power draw.

Aspect 10. The vehicle electrical system of aspect 9, wherein the controller is configured to shed one or more loads of the transport climate control load network by instructing a variable speed compressor of the transport climate control load network to reduce speed.

Aspect 11. The vehicle electrical system of any one of aspects 9 and 10, wherein the controller is configured to shed one or more loads of the transport climate control load network by stopping operation of at least one of an evaporator blower, a condenser fan and a heater.

Aspect 12. The vehicle electrical system of any one of aspects 9-11, wherein the controller is configured to:
determine one or more loads of the transport climate control network that are in operation;
access a power rating of each of the one or more loads that are in operation;
add the power rating of each of the one or more loads that are in operation to determine the power draw of the transport load network.

Aspect 13. The vehicle electrical system of aspect 12, wherein the one or more loads includes a variable speed compressor.

Aspect 14. The vehicle electrical system of any one of aspects 9-13, wherein the controller is configured to:
monitor a current amount supplied to the DC regulated bus of the vehicle electrical system; and
subtract the power draw of the transport climate control load network from the current amount supplied to the DC regulated bus to determine the amount of power available from the vehicle electrical system.

Aspect 15. The vehicle electrical system of any one of aspects 9-14, wherein the controller is configured to determine a vehicle voltage provided by the vehicle power network to the DC regulated bus of the vehicle electrical system and determine the amount of power available from the vehicle electrical system based on a droop in the vehicle voltage from an expected vehicle voltage value.

Aspect 16. The vehicle electrical system of any one of aspects 9-15, wherein the vehicle electrical system is configured to:
exclusively supply power from the vehicle power network to the transport climate control load network;
exclusively supply power from the auxiliary battery system to the transport climate control load network; and
supply power to the transport climate control load network from a combination of the vehicle power network and the auxiliary battery system.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for power and load management of a transport climate control system using a vehicle electrical system that includes a vehicle power network and an auxiliary battery system connected to a transport climate control load network via a voltage direct current (DC) regulated bus, the method comprising:
a controller determining a power draw of the transport climate control load network;
the controller determining an amount of power available from the vehicle electrical system;
the controller determining whether the power draw of the transport climate control load network exceeds the amount of power available from the vehicle electrical system;
shedding one or more loads of the transport climate control load network to reduce the power draw of the transport climate control load network until the power draw of the transport climate control load network matches the power available from the vehicle electrical system; and
supplying power from the vehicle electrical system to the transport climate control load network,
wherein determining the amount of power available from the vehicle electrical system includes determining a vehicle voltage provided by the vehicle power network to the DC regulated bus of the vehicle electrical system and determining the amount of power available from the vehicle electrical system based on a droop in the vehicle voltage from an expected vehicle voltage value.

2. The method of claim 1, wherein shedding one or more loads of the transport climate control load network includes reducing a speed of a variable speed compressor of the transport climate control load network.

3. The method of claim 1, wherein shedding one or more loads of the transport climate control load network includes stopping operation of at least one of an evaporator blower, a condenser fan and a heater.

4. The method of claim 3, wherein the one or more loads includes a variable speed compressor.

5. The method of claim 1, wherein determining the power draw of the transport climate control load network includes:
determining one or more loads of the transport climate control network that are in operation;
accessing a power rating of each of the one or more loads that are in operation;
adding the power rating of each of the one or more loads that are in operation to determine the power draw of the transport load network.

6. The method of claim 1, wherein supplying power from the vehicle electrical system to the transport climate control load network includes:
exclusively supplying power from the vehicle power network to the transport climate control load network;
exclusively supplying power from the auxiliary battery system to the transport climate control load network; and
the vehicle power network and the auxiliary battery system supplying power to the transport climate control load network.

7. A vehicle electrical system for power and load management of a transport climate control system, the vehicle electrical system comprising:
a voltage direct current (DC) regulated bus;
a vehicle power network configured to generate power from a vehicle and provide the generated power to the voltage DC regulated bus;

an auxiliary power network that includes an auxiliary battery system connected to the DC regulated bus, wherein the auxiliary battery system is configured to store power and supply the stored power to the DC regulated bus;

a transport climate control load network receiving power from the DC regulated bus; and a controller configured to determine a power draw of the transport climate control load network, to determine an amount of power available from the vehicle electrical system, and to determine whether the power draw of the transport climate control load network exceeds the amount of power available from the vehicle electrical system;

wherein the vehicle electrical system is configured to shed one or more loads of the transport climate control load network to reduce the power draw of the transport climate control load network until the power draw of the transport climate control load network matches the power available from the vehicle electrical system, and wherein the controller is configured to determine a vehicle voltage provided by the vehicle power network to the DC regulated bus of the vehicle electrical system and determine the amount of power available from the vehicle electrical system based on a droop in the vehicle voltage from an expected vehicle voltage value.

8. The vehicle electrical system of claim 7, wherein the controller is configured to shed one or more loads of the transport climate control load network by instructing a variable speed compressor of the transport climate control load network to reduce speed.

9. The vehicle electrical system of claim 7, wherein the controller is configured to shed one or more loads of the transport climate control load network by stopping operation of at least one of an evaporator blower, a condenser fan and a heater.

10. The vehicle electrical system of claim 7, wherein the controller is configured to:
  determine one or more loads of the transport climate control network that are in operation;
  access a power rating of each of the one or more loads that are in operation;
  add the power rating of each of the one or more loads that are in operation to determine the power draw of the transport load network.

11. The vehicle electrical system of claim 10, wherein the one or more loads includes a variable speed compressor.

12. The vehicle electrical system of claim 7, wherein the vehicle electrical system is configured to:
  exclusively supply power from the vehicle power network to the transport climate control load network;
  exclusively supply power from the auxiliary battery system to the transport climate control load network; and
  supply power to the transport climate control load network from a combination of the vehicle power network and the auxiliary battery system.

13. A method for power and load management of a transport climate control system using a vehicle electrical system that includes a vehicle power network and an auxiliary battery system connected to a transport climate control load network via a voltage direct current (DC) regulated bus, the method comprising:
  a controller determining a power draw of the transport climate control load network;
  the controller determining an amount of power available from the vehicle electrical system;
  the controller determining whether the power draw of the transport climate control load network exceeds the amount of power available from the vehicle electrical system;
  shedding one or more loads of the transport climate control load network to reduce the power draw of the transport climate control load network until the power draw of the transport climate control load network matches the power available from the vehicle electrical system; and
  supplying power from the vehicle electrical system to the transport climate control load network,
  wherein determining the amount of power available from the vehicle electrical system includes:
    monitoring a current amount supplied to the DC regulated bus of the vehicle electrical system; and
    subtracting the power draw of the transport climate control load network from the current amount supplied to the DC regulated bus to determine the amount of power available from the vehicle electrical system.

14. The method of claim 13, wherein shedding one or more loads of the transport climate control load network includes reducing a speed of a variable speed compressor of the transport climate control load network.

15. The method of claim 13, wherein shedding one or more loads of the transport climate control load network includes stopping operation of at least one of an evaporator blower, a condenser fan and a heater.

16. The method of claim 13, wherein determining the power draw of the transport climate control load network includes:
  determining one or more loads of the transport climate control network that are in operation;
  accessing a power rating of each of the one or more loads that are in operation;
  adding the power rating of each of the one or more loads that are in operation to determine the power draw of the transport load network.

17. The method of claim 15, wherein the one or more loads includes a variable speed compressor.

18. The method of claim 13, wherein supplying power from the vehicle electrical system to the transport climate control load network includes:
  exclusively supplying power from the vehicle power network to the transport climate control load network;
  exclusively supplying power from the auxiliary battery system to the transport climate control load network; and
  the vehicle power network and the auxiliary battery system supplying power to the transport climate control load network.

19. A vehicle electrical system for power and load management of a transport climate control system, the vehicle electrical system comprising:
  a voltage direct current (DC) regulated bus;
  a vehicle power network configured to generate power from a vehicle and provide the generated power to the voltage DC regulated bus;
  an auxiliary power network that includes an auxiliary battery system connected to the DC regulated bus, wherein the auxiliary battery system is configured to store power and supply the stored power to the DC regulated bus;
  a transport climate control load network receiving power from the DC regulated bus; and a controller configured to determine a power draw of the transport climate control load network, to determine an amount of power available from the vehicle electrical system, and to determine whether the power draw of the transport climate control load network exceeds the amount of power available from the vehicle electrical system;

wherein the vehicle electrical system is configured to shed one or more loads of the transport climate control load network to reduce the power draw of the transport climate control load network until the power draw of the transport climate control load network matches the power available from the vehicle electrical system, and wherein the controller is configured to:
- monitor a current amount supplied to the DC regulated bus of the vehicle electrical system; and
- subtract the power draw of the transport climate control load network from the current amount supplied to the DC regulated bus to determine the amount of power available from the vehicle electrical system.

20. The vehicle electrical system of claim 19, wherein the controller is configured to shed one or more loads of the transport climate control load network by instructing a variable speed compressor of the transport climate control load network to reduce speed.

* * * * *